(12) United States Patent
Shi et al.

(10) Patent No.: US 11,072,421 B2
(45) Date of Patent: Jul. 27, 2021

(54) AUTONOMOUS FLYING AMBULANCE

(71) Applicant: California Institute of Technology, Pasadena, CA (US)

(72) Inventors: Xichen Shi, Pasadena, CA (US); Marcel Veismann, Pasadena, CA (US); Christopher J. Dougherty, Pasadena, CA (US); Stephanie Rider, Los Angeles, CA (US); Soon-Jo Chung, La Cañada, CA (US); Morteza Gharib, Altadena, CA (US); Kyunam Kim, Pasadena, CA (US); Salar Rahili, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 83 days.

(21) Appl. No.: 16/150,183

(22) Filed: Oct. 2, 2018

(65) Prior Publication Data

US 2019/0106206 A1    Apr. 11, 2019

Related U.S. Application Data

(60) Provisional application No. 62/566,984, filed on Oct. 2, 2017, provisional application No. 62/670,496, filed on May 11, 2018.

(51) Int. Cl.
*B64C 27/26* (2006.01)
*B64C 11/00* (2006.01)
(Continued)

(52) U.S. Cl.
CPC ............... *B64C 27/26* (2013.01); *B64C 3/56* (2013.01); *B64C 11/001* (2013.01); *B64C 11/02* (2013.01);
(Continued)

(58) Field of Classification Search
CPC ......... B64C 27/26; B64C 27/20; B64C 27/52; B64C 27/56; B64C 3/56; B64C 11/001; B64C 11/02; B64C 15/02
See application file for complete search history.

(56) References Cited

U.S. PATENT DOCUMENTS

| 2003/0094537 A1* | 5/2003 | Austen-Brown | B64D 25/00 |
| | | | 244/7 R |
| 2004/0245374 A1* | 12/2004 | Morgan | B64C 5/02 |
| | | | 244/12.3 |

(Continued)

FOREIGN PATENT DOCUMENTS

| KR | 101386959 B1 | 4/2014 |
| WO | 2019070752 A1 | 4/2019 |

OTHER PUBLICATIONS

International Preliminary Report on Patentability for International Application No. PCT/US2018/054017, dated Apr. 8, 2020, dated Apr. 16, 2020, 12 pgs.

(Continued)

*Primary Examiner* — Justin M Benedik
(74) *Attorney, Agent, or Firm* — KPPB LLP

(57) ABSTRACT

An automated flying transport vehicle that capitalizes on the strengths and complexities of a fixed and rotary winged aircraft. The air transport vehicle comprises a body aerodynamically designed to generate lift and a plurality of rotors that can generate lift as well as forward thrust from which a fixed wing portion of the air transport vehicle will begin to generate additional lift allowing for a sustained flight.

14 Claims, 25 Drawing Sheets

(51) Int. Cl.
*B64C 11/02* (2006.01)
*B64C 39/02* (2006.01)
*B64C 27/52* (2006.01)
*B64C 29/02* (2006.01)
*B64C 3/56* (2006.01)
*B64C 27/20* (2006.01)
*B64C 29/00* (2006.01)
*B64C 27/56* (2006.01)
*B64C 15/02* (2006.01)
*B64C 23/00* (2006.01)

(52) U.S. Cl.
CPC .............. *B64C 15/02* (2013.01); *B64C 27/20* (2013.01); *B64C 27/52* (2013.01); *B64C 27/56* (2013.01); *B64C 29/0025* (2013.01); *B64C 29/0033* (2013.01); *B64C 29/02* (2013.01); *B64C 39/02* (2013.01); *B64C 23/00* (2013.01)

(56) References Cited

U.S. PATENT DOCUMENTS

| | | | |
|---|---|---|---|
| 2011/0036939 | A1 | 2/2011 | Easter |
| 2011/0315806 | A1 | 12/2011 | Piasecki et al. |
| 2012/0043413 | A1* | 2/2012 | Smith ................ B64C 29/0033 244/12.4 |
| 2013/0020429 | A1* | 1/2013 | Kroo .................. B64C 29/0025 244/6 |
| 2016/0114887 | A1* | 4/2016 | Zhou .................... B64C 39/024 348/148 |
| 2016/0272314 | A1 | 9/2016 | Radu |

OTHER PUBLICATIONS

International Search Report and Written Opinion for International Application No. PCT/US2018/054017, Search completed Jan. 31, 2019, dated Jan. 31, 2019, 17 pgs.
Markforged, Markforged Materials, Sep. 28, 2018, markforged.com/materials/#onyx, 7 pgs.
"GALCIT AFA", Sep. 18, 2018, 3 pgs.
Achtelik et al., "Design of a multi rotor mav with regard to efficiency, dynamics and redundancy", AIAA Guidance, Navigation, and Control Conference, Aug. 13-16, 2012, AIA 2012-4779, pp. 1-17, doi: doi.org/10.2514/6.2012-4779.
Alwi et al., "Fault Tolerant Control of an Octorotor Using LPV Based Sliding Mode Control Allocation", American Control Conference, Jun. 17-19, 2013, pp. 6505-6510, doi: 10.1109/ACC.2013.6580859.
Bandyopadhyay et al., "Nonlinear attitude control of spacecraft with a large captured object", Journal of Guidance, Control, and Dynamics, Apr. 4, 2016, vol. 39, No. 4, pp. 754-769, doi: 10.2514/1.G001341.
Bry et al., "Aggressive flight of fixed-wing and quadrotor aircraft in dense indoor environments", The International Journal of Robotics Research, Mar. 20, 2015, vol. 34, No. 7, pp. 969-1002, doi: 10.1177/0278364914558129.
Choi et al., "Optimization of Multi-Package Drone Deliveries Considering Battery Capacity", Presentation at the 2017 TRB 96th Annual Meeting, 2016, Optimization of Multi-Package Drone Deliveries Considering Battery Capacity, 16 pgs.
Chowdhury et al., "Back-Stepping Control Strategy for Stabilization Of a Tilt-Rotor UAV", 24th Chinese Control and Decision Conference, May 23-25, 2012, pp. 3475-3480, doi: 10.1109/CCDC.2012.6244555.
Crowther et al., "Kinematic analysis and control design for a nonplanar multirotor vehicle", Journal of Guidance, Control, and Dynamics, Jul.-Aug. 2011, vol. 34, No. 4, pp. 1157-1171, doi: 10.2514/1.51186.
Du et al., "Controllability Analysis and Degraded Control for a Class of Hexacopters Subject to Rotor Failures", Journal of Intelligent & Robotic Systems, 2015, vol. 78, No. 1, pp. 143-157, doi: 10.1007/s10846-014-0103-0.
Efraim et al., "Quadrotor with a dihedral angle: on the effects of tilting the rotors inwards", Journal of Intelligent & Robotic Systems, Jan. 2, 2015, vol. 80, No. 2, pp. 313-324, doi: 10.1007/s10846-015-0176-4.
Enns, "Control allocation approaches", Guidance, Navigation, and Control Conference and Exhibit, 1998, pp. 98-108, doi: 10.2514/6.1998-4109.
Falconi et al., "Adaptive fault tolerant control allocation for a hexacopter system", American Control Conference, Jul. 6-8, 2016, pp. 6760-6766, doi: 10.1109/ACC.2016.7526736.
Floreano et al., "Science, technology and the future of small autonomous drones", Nature, May 28, 2015, vol. 521, pp. 460-466, doi: 10.1038/nature14542.
Frank et al., "Hover, transition, and level flight control design for a single-propeller indoor airplane", AIAA Guidance, Navigation and Control Conference and Exhibit, Aug. 20-23, 2007, doi: https://doi.org/10.2514/6.2007-6318.
Gharib et al., "Autonomous Flying Ambulance", Aerospace Robotics and Control at Caltech, Sep. 1, 2018, aerospacerobotics.caltech.edu/urban-air-mobility-and-autonomous-flying-cars/.
Giribet et al., "Analysis and design of a tilted rotor hexacopter for fault tolerance", IEEE Transactions on Aerospace and Electronic Systems, Aug. 2016, vol. 52, No. 4, pp. 1555-1567, doi: 10.1109/TAES.2016.140885.
Hauser et al., "Aggressive Flight Maneuvers", Proceedings of the 36th IEEE Conference on Decision and Control, vol. 5, Dec. 12, 1997, pp. 4186-4191, doi: 10.1109/CDC.1997.649490.
Hermann et al., "Nonlinear controllability and observability", IEEE Transactions on Automatic Control, Oct. 1977, vol. AC-22, No. 5, pp. 728-740, doi: 10.1109/TAC.1977.1101601.
Holden et al., "Uber elevate: Fast-forwarding to a future of on-demand urban air transportation", Uber, Tech. Rep., Oct. 27, 2016, 98 pgs.
Hua et al., "A control approach for thrust-propelled underactuated vehicles and its application to vtol drones", IEEE Transactions on Automatic Control, Jul. 24, 2009, vol. 54, No. 8, pp. 1837-1853, doi: 10.1109/TAC.2009.2024569.
Johansen et al., "Control allocation a survey", Automatica, May 2013, vol. 49, No. 5, pp. 1087-1103, doi: 10.1016/j.automatica.2013.01.035.
Kalman et al., "Contributions to the Theory of Optimal Control", Bol. Soc. Mat. Mexicana, 1960, vol. 5, No. 2, pp. 102-119.
Kaufman et al., "Design and Development of a Free-Floating Hexrotor UAV for 6-DOF Maneuvers", IEEE Aerospace Conference, Mar. 1-8, 2014, pp. 1-10, doi: 10.1109/AERO.2014.6836427.
Khalil, "Nonlinear systems", Prentice-Hall, New Jersey, 1996, 2(5):5-1.
Klumpp, "Singularity-free extraction of a quaternion from a direction-cosine matrix", Journal of spacecraft and rockets, Feb. 17, 1976, vol. 13, No. 12, pp. 754-755, doi: 10.2514/3.27947.
Lanzon et al., "Flight control of a quadrotor vehicle subsequent to a rotor failure", Journal of Guidance, Control, and Dynamics, Feb. 12, 2014, vol. 37, No. 2, pp. 580-591, doi: 10.2514/1.59869.
Lee, "Exponential stability of an attitude tracking control system on so (3) for large-angle rotational maneuvers", Systems & Control Letters, Jan. 2012, vol. 61, No. 1, pp. 231-237, doi: 10.1016/j.sysconle.2011.10.017.
Lee et al., "Foundations of optimal control theory", John Wiley & Sons, 1967.
Lee et al., "Fault Tolerant Control of Hexacopter for Actuator Faults using Time Delay Control Method", International Journal of Aeronautical and Space Sciences, Jan. 14, 2016, vol. 17, No. 1, pp. 54-63, doi: 10.5139/IJASS.2016.17.1.54.
Meier et al., "Pixhawk: A micro aerial vehicle design for autonomous flight using onboard computer vision", Autonomous Robots, Aug. 2012, vol. 33, No. 1-2, pp. 21-39, doi: 10.1007/s10514-012-9281-4.
Mellinger et al., "Minimum snap trajectory generation and control for quadrotors", IEEE International Conference on Robotics and Automation, May 9-13, 2011, pp. 2520-2525, doi: 10.1109/ICRA.2011.5980409.

(56) References Cited

OTHER PUBLICATIONS

Menon et al., "Nonlinear flight test trajectory controllers for aircraft", Journal of Guidance, Control, and Dynamics, Jan.-Feb. 1987, vol. 10, No. 1, pp. 67-72, doi: doi.org/10.2514/3.20182.
Michieletto et al., "Control of statically hoverable multi-rotor aerial vehicles and application to rotor-failure robustness for hexarotors", IEEE International Conference on Robotics and Automation, May 29-Jun. 3, 2017, pp. 2747-2752, doi: 10.1109/ICRA.2017.7989320.
Mueller et al., "Stability and control of a quadrocopter despite the complete loss of one, two, or three propellers", Robotics and Automation, IEEE International Conference, May 31-Jun. 7, 2014, pp. 45-52, doi: 10.1109/ICRA.2014.6906588.
Murray et al., "The flying sidekick traveling salesman problem: Optimization of drone-assisted parcel delivery", Transportation Research Part C: Emerging Technologies, Mar. 2015, vol. 54, pp. 86-109, doi: 10.1016/j.trc.2015.03.005.
Oosedo et al., "Optimal transition from hovering to level-flight of a quadrotor tail-sitter UAV", Autonomous Robots, vol. 41, No. 5, 2017, First Published Jul. 25, 2016, pp. 1143-1159, doi: 10.1007/s10514-016-9599-4.
Papachristos et al., "Model Predictive Attitude Control of an unmanned Tilt-Rotor Aircraft", Industrial Electronics, IEEE International Symposium on Jun. 27-30, 2011, pp. 922-927, doi: 10.1109/ISIE.2011.5984282.
Park et al., "Fault tolerant flight control system for the tilt-rotor uav", Journal of the Franklin Institute, vol. 350, No. 9, Nov. 2013, pp. 2535-2559, doi: 10.1016/j.jfranklin.2013.01.014.
Perez et al., "A ground control station for a multi-uav surveillance system", Journal of Intelligent & Robotic Systems, Jan. 2013, vol. 69, No. 1, pp. 119-130, doi: 10.1007/s10846-012-9759-5.
Renuke, "Dynamic Analysis of a Car Chassis", International Journal of Engineering Research and Applications, Nov.-Dec. 2012, vol. 2, No. 6, pp. 955-959.
Ritz et al., "A global controller for flying wing tailsitter vehicles", IEEE International Conference on Robotics and Automation, May 29-Jun. 3, 2017, pp. 2731-2738, doi: 10.1109/ICRA.2017.7989318.
Rogers, "Propeller Efficiency Rule of Thumb", NAR Associates, 2010.
Ryll et al., "A Novel Overactuated Quadrotor Unmanned Aerial Vehicle: Modeling, Control, And Experimental Validation", IEEE Transactions on Control Systems Technology, Mar. 2015, vol. 23, No. 2, pp. 540-556, doi: 10.1109/TCST.2014.2330999.
Ryll et al., "Modeling and control of fast-hex: A fully-actuated by synchronized tilting hexarotor", IEEE/RSJ International Conference on Intelligent Robots and Systems, Oct. 9-14, 2016, pp. 1689-1694, doi: 10.1109/IROS.2016.7759271.
Rysdyk et al., "Adaptive model inversion flight control for tilt-rotor aircraft", Journal of guidance, control, and dynamics, May-Jun. 1999, vol. 22, No. 3, pp. 402-407, doi: 10.2514/2.4411.
Saied et al., "Fault diagnosis and fault-tolerant control strategy for rotor failure in an octorotor", IEEE International Conference on Robotics and Automation, May 26-30, 2015, pp. 5266-5271, doi: 10.1109/ICRA.2015.7139933.
Sheldahl et al., "Aerodynamic characteristics of seven symmetrical airfoil sections through 180-degree angle of attack for use in aerodynamic analysis of vertical axis wind turbines", Sandia National Labs., Albuquerque, NM (USA), Technical Report, 1981, 124 pgs., doi: 10.2172/6548367.
Shepperd, "Quaternion from rotation matrix", Journal of Guidance and Control, vol. 1, May-Jun. 1978, pp. 223-224.
Stone et al., "Flight testing of the t-wing tail-sitter unmanned air vehicle", Journal of Aircraft, vol. 45, No. 2, pp. 673-685, Mar.-Apr. 2008, doi: 10.2514/1.32750.
Tayebi et al., "Attitude stabilization of a VTOL quadrotor aircraft", IEEE Transactions on control systems technology, vol. 14, No. 3, May 2006, pp. 562-571, doi: 10.1109/TCST.2006.872519.
Tomic et al., "Toward a Fully Autonomous UAV: Research Platform for Indoor and Outdoor Urban Search and Rescue", IEEE Robotics Automation Magazine, vol. 19, No. 3, Sep. 4, 2012, No. 46-56, doi: 10.1109/MRA.2012.2206473.
Valavanis et al., "Handbook of Unmanned Aerial Vehicles", Springer Publishing Company, Incorporated, 2014, 3015 pgs, (presented in 3 parts).
Veismann et al., "Autonomous Flying Ambulance Aerodynamic Characterization", Analysis Report, California Institute of Technology, Aug. 9, 2018, 20 pgs.
Wick, "Study of the subsonic forces and moments on an inclined plate of infinite span", National Advisory Committee for Aeronautics, Technical Note 3221, Jun. 1954, 26 pgs.
Zhang et al., "A controllable flying vehicle with a single moving part", IEEE International Conference on Robotics and Automation, May 16-21, 2016, pp. 3275-3281, doi: 10.1109/ICRA.2016.7487499.

* cited by examiner

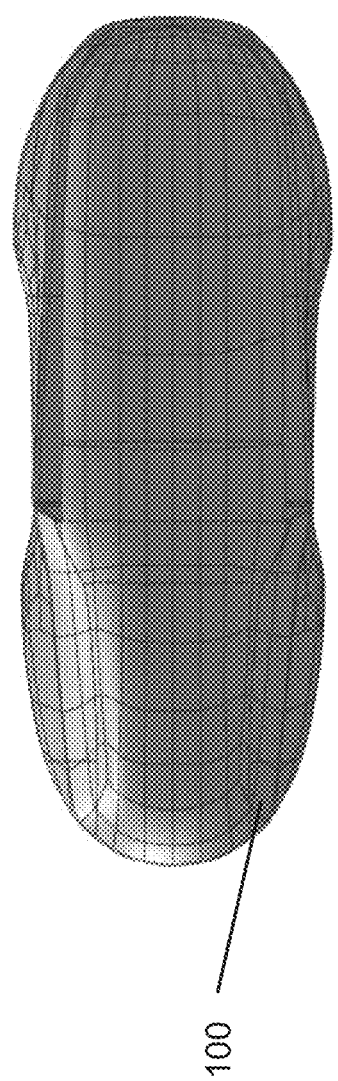
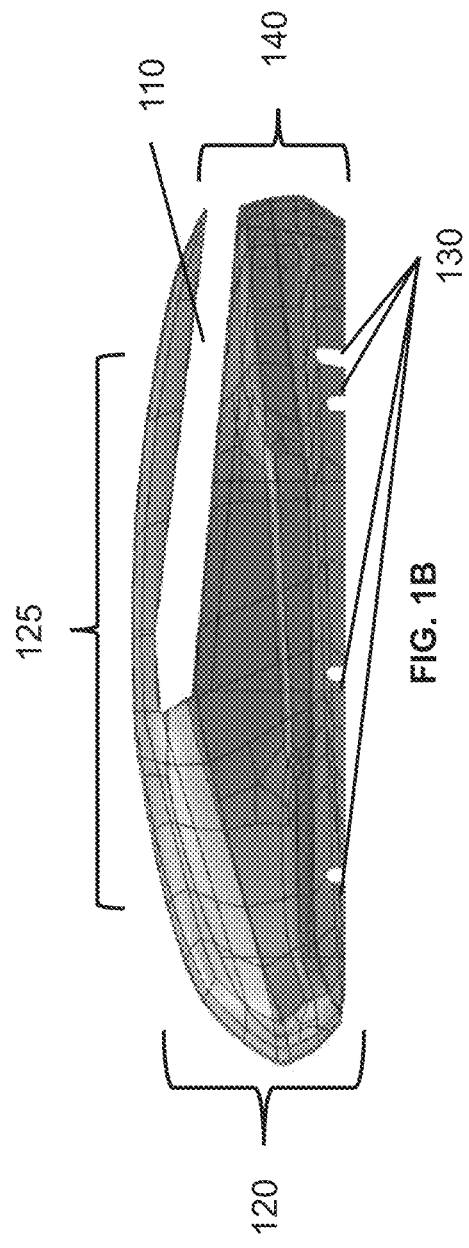
FIG. 1A
FIG. 1B

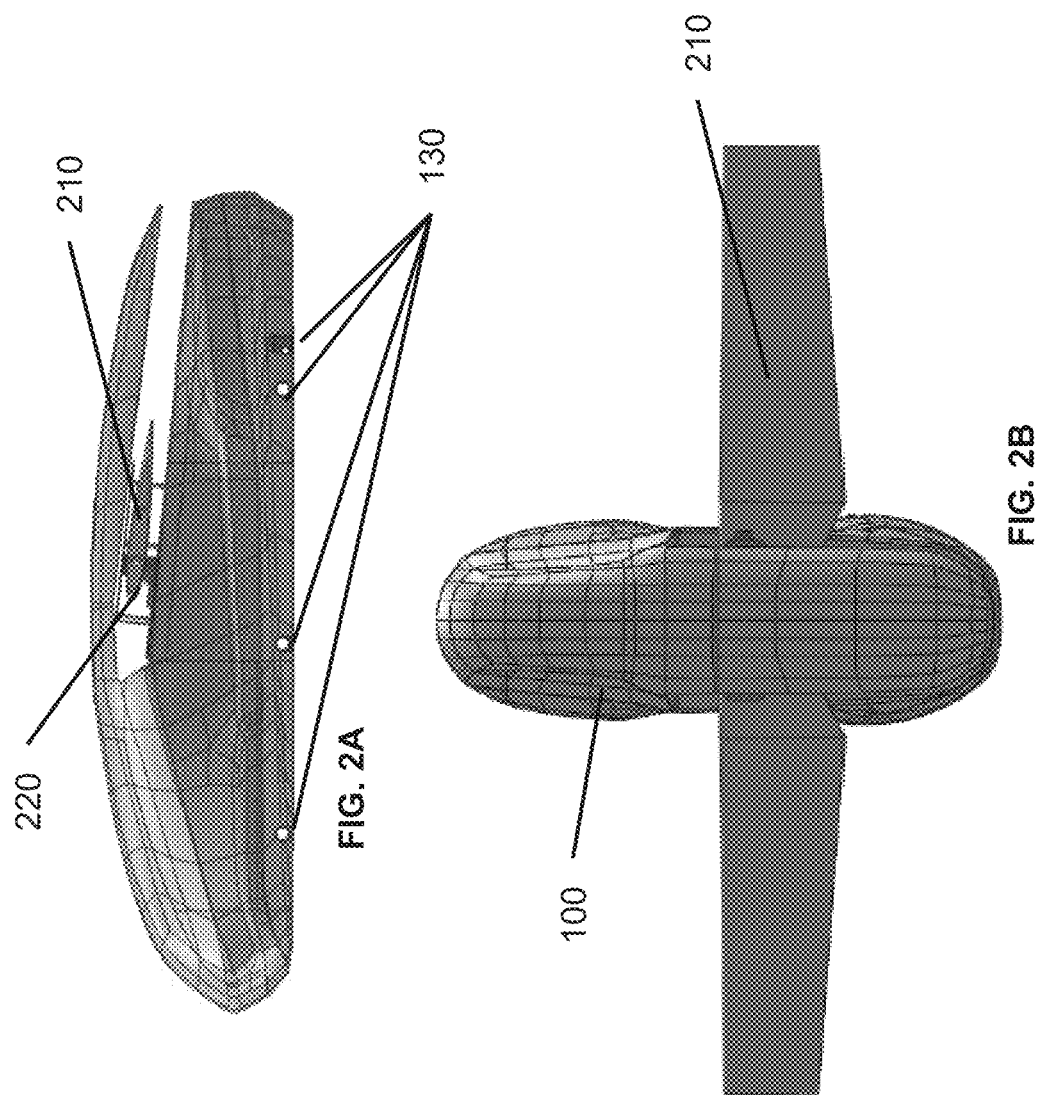

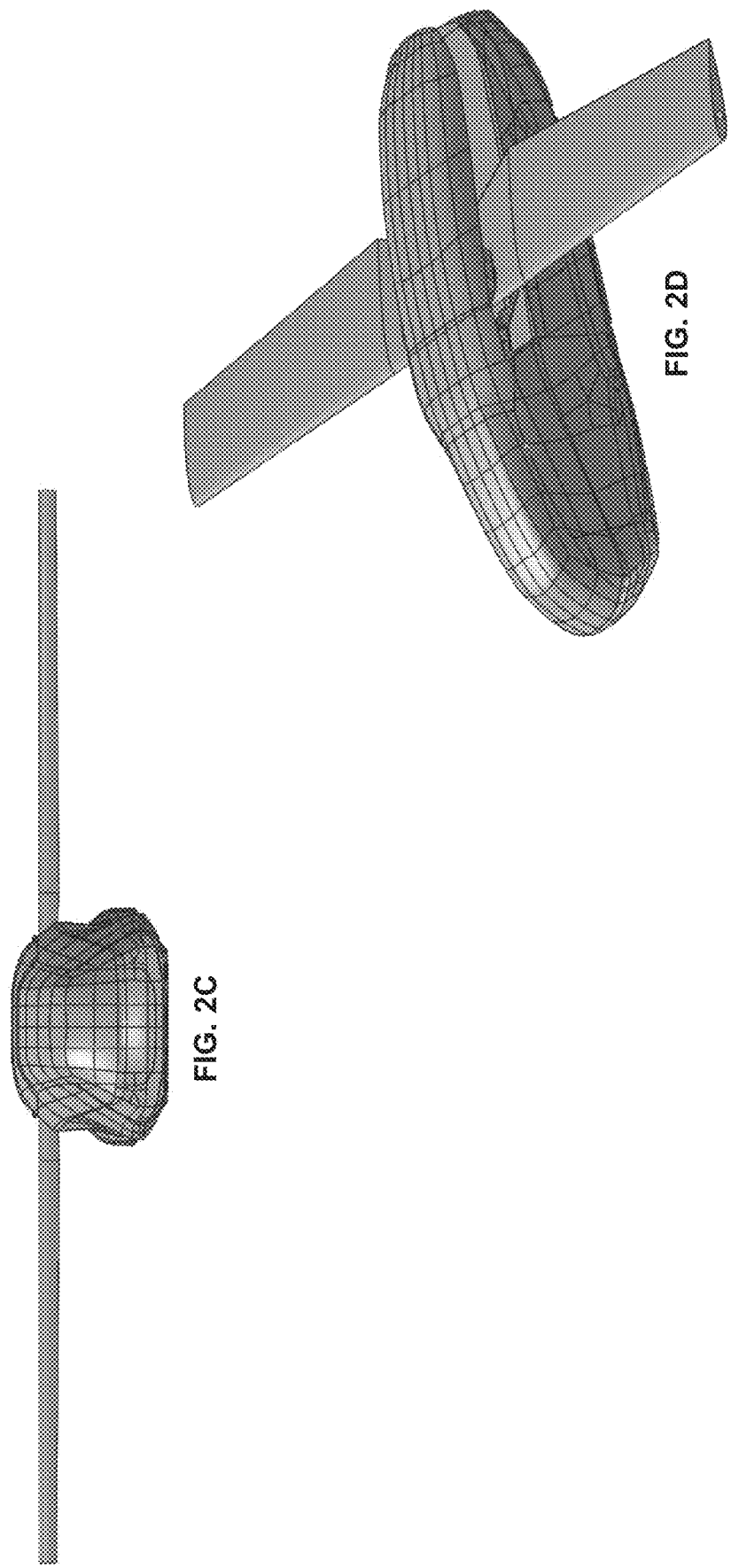

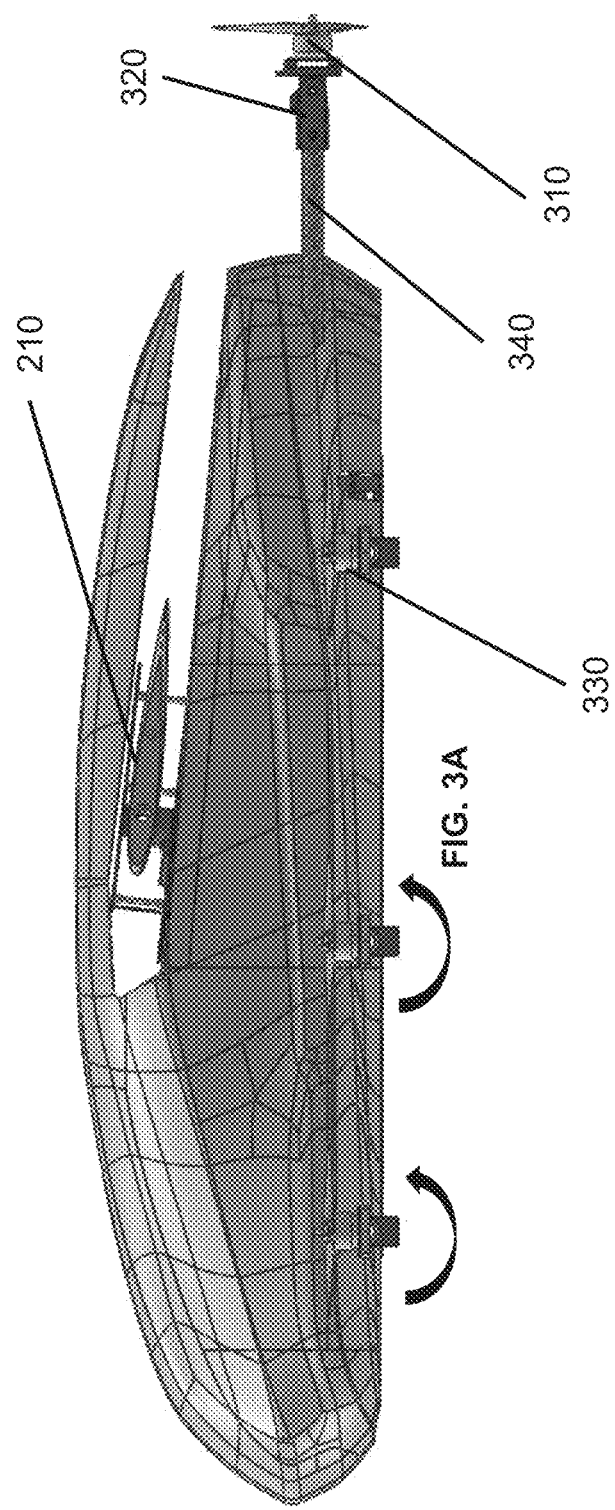

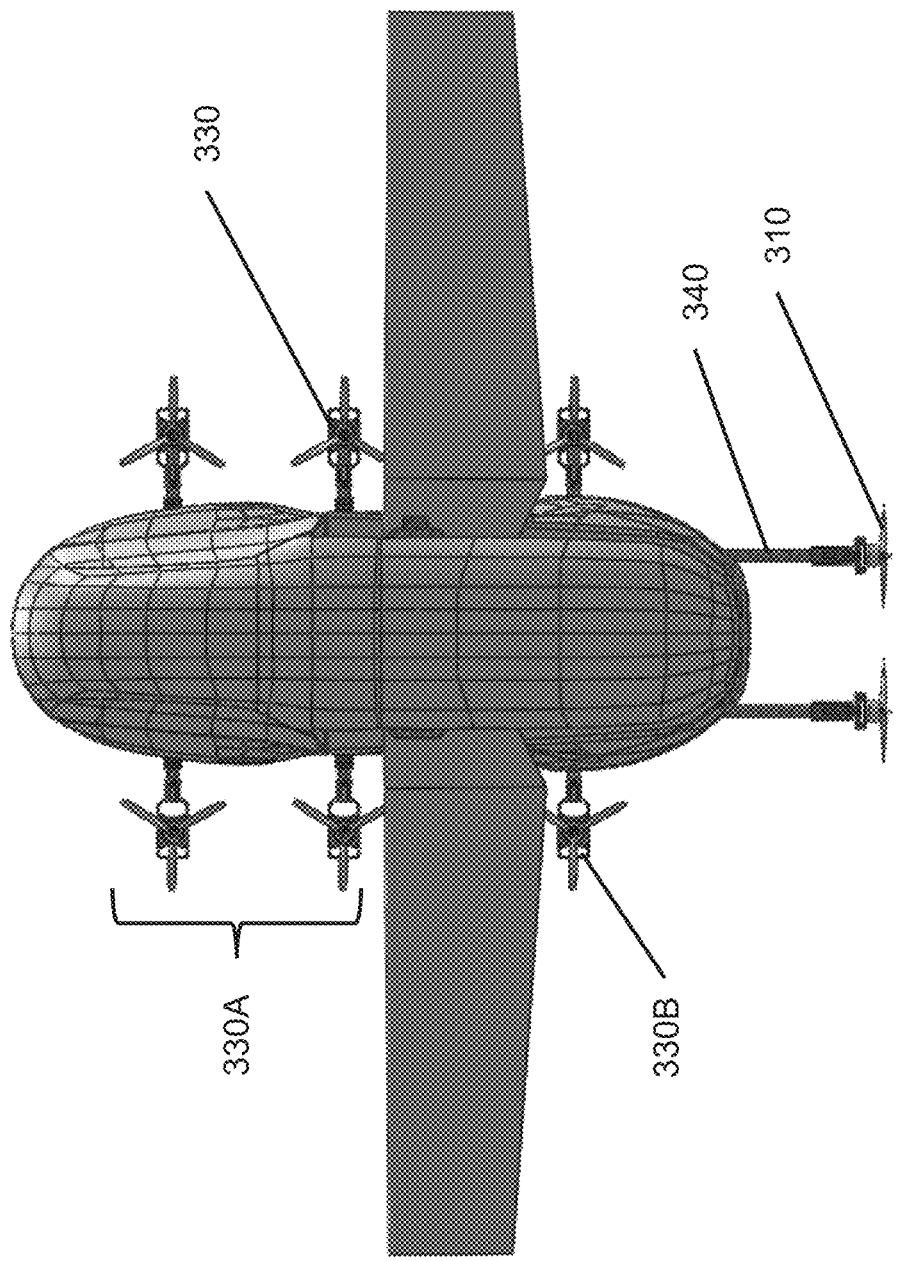

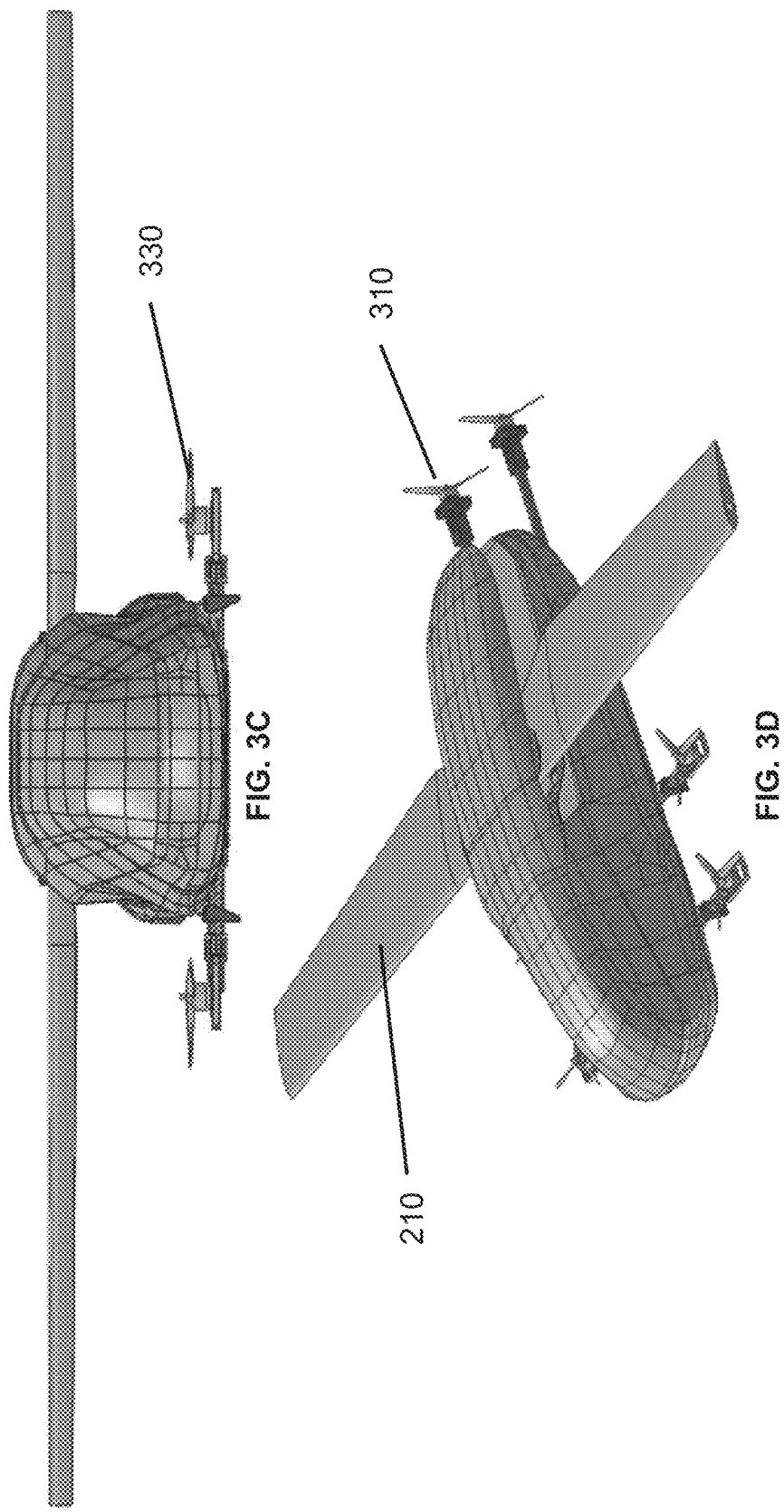

310

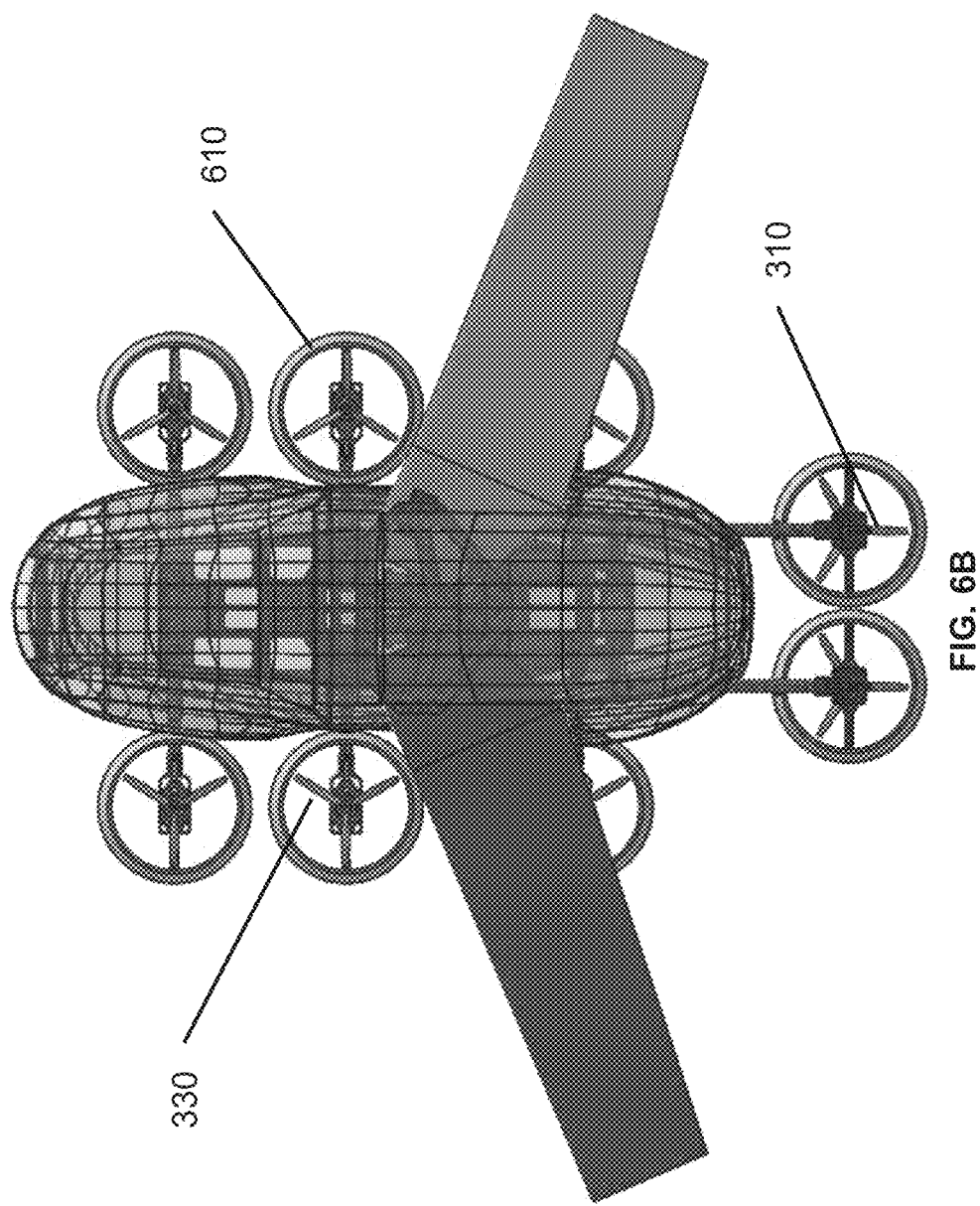

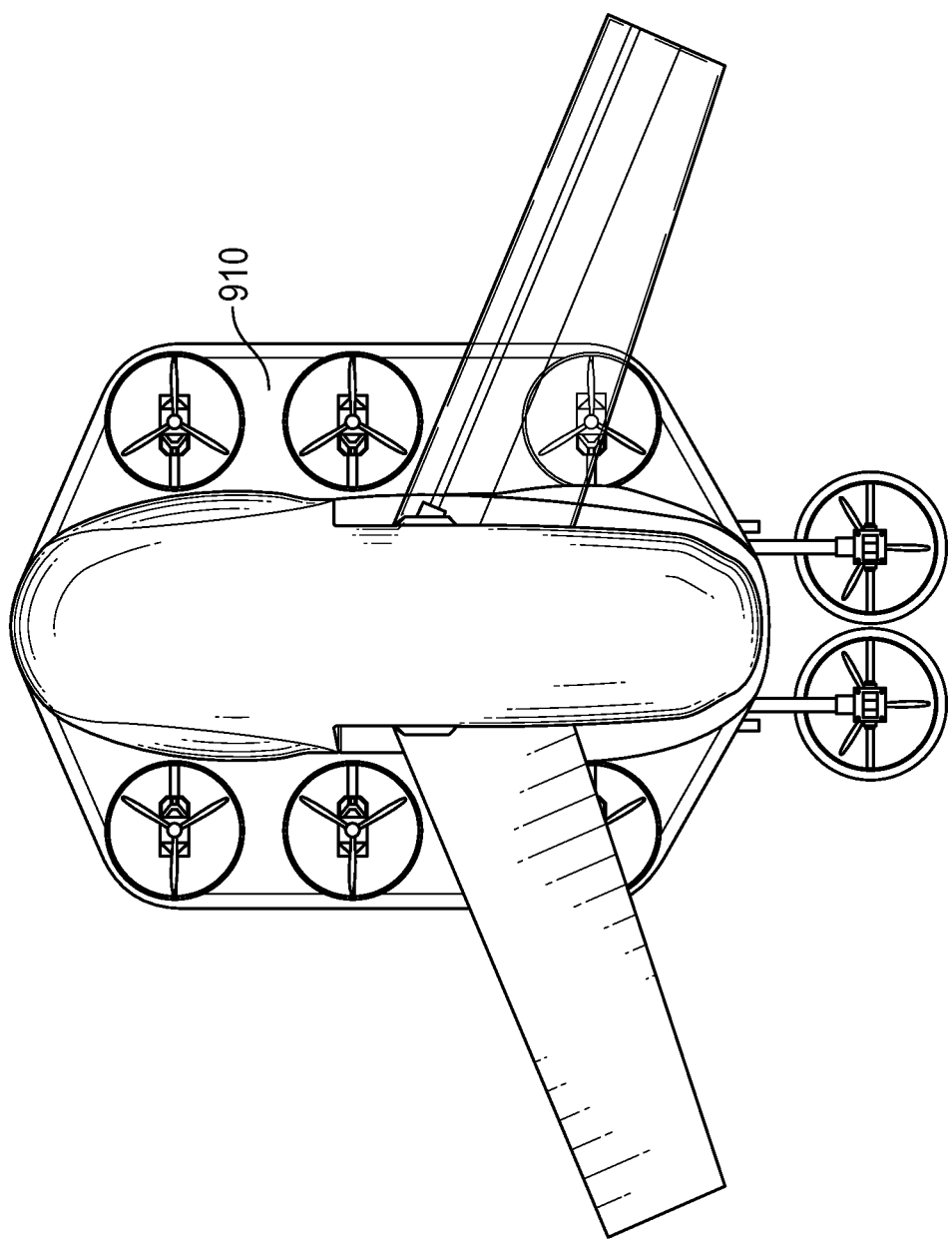

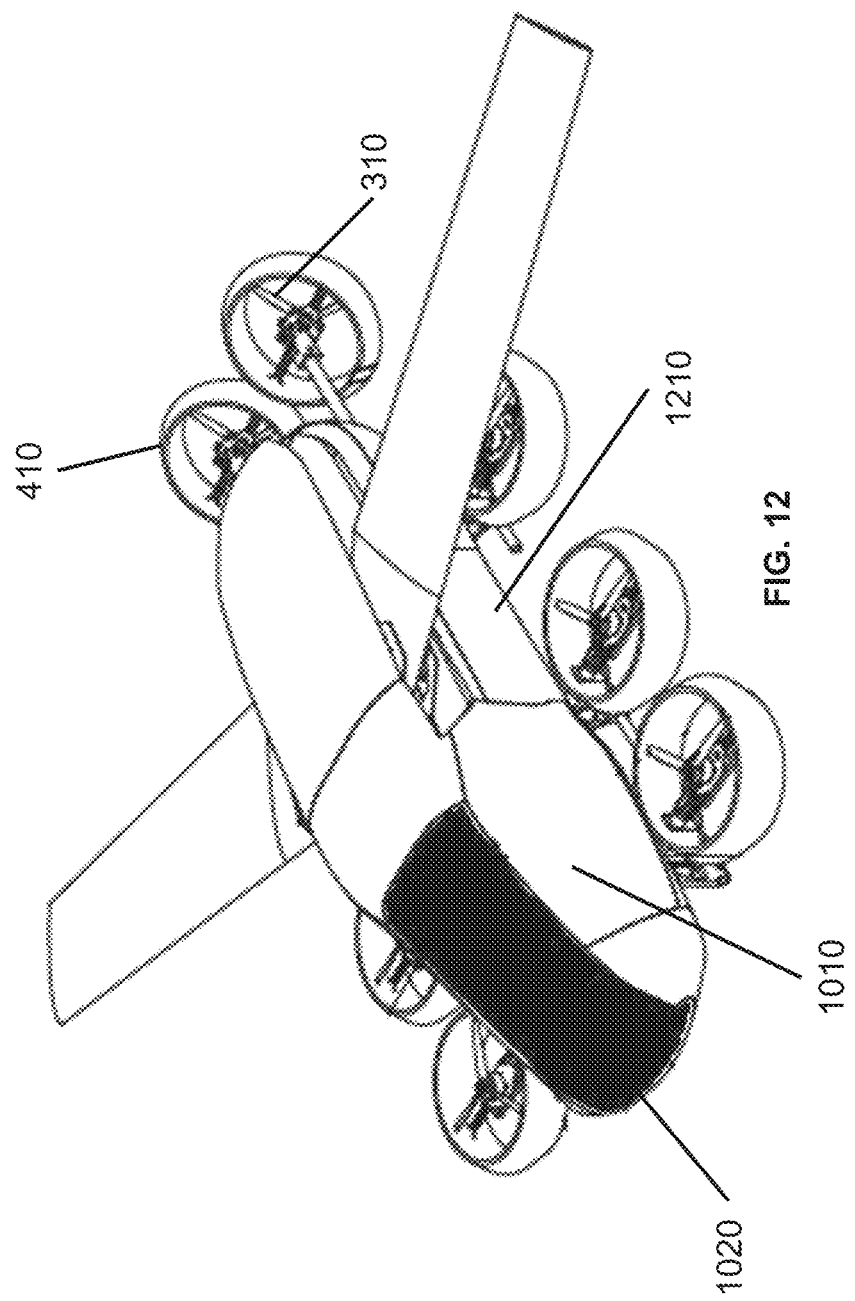

AUTONOMOUS FLYING AMBULANCE

CROSS-REFERENCE TO RELATED APPLICATIONS

This application claims priority to U.S. Provisional Patent Application No. 62/566,984 filed on Oct. 2, 2017 and U.S. Provisional Patent Application No. 62/670,496 filed on May 11, 2018, the disclosures of which are herein incorporated by reference in their entireties.

FIELD OF THE INVENTION

This application generally refers to autonomous flying vehicles. Specifically, the application is directed to autonomous flying vehicles capable of transporting people or other payloads in a variety of environments including urban environments.

BACKGROUND

Smaller individual air transport vehicle systems are increasingly playing a larger role in today's society. With rapid improvements in design as well as decreases in size and cost, small aerial vehicles are being used in more areas of everyday life. Some uses have included transporting small packages, and providing logistical and tactical support in military operations. In some situations, the air transport vehicles are adding autonomy to the systems to remove the human control element. There is however, a need for improved systems and methods for rapid and cost effective deployment of an air transport that is capable of being deployed in a variety of environments.

SUMMARY OF THE INVENTION

Systems and methods in accordance with many embodiments of the invention are directed to an improved transport system that may be utilized in variety of situations including the field of medical air transport.

In many embodiments, automated air transport systems and methods of control are provided that improve the reliability and functionality of such systems.

Many embodiments include an elongated body with an outer surface that has a top portion, a bottom portion, a first and second side portion and a front and back portion, such that the outer surface further defines an inner cavity. The body also has a slotted opening disposed through the first and second side portions and positioned within the body near an upper portion of the body. The slotted opening may be configured to accept an airfoil disposed within the slotted opening and configured to generate lift during flight. Additionally, many embodiments include a plurality of side rotors each having a rotor housing. Each of the rotors are disposed along each of the first and second side portions near the bottom portion of the body such that the majority of the body is disposed above the plurality of rotors. Each rotor is connected to an elongated side shaft having a proximal end and a distal end wherein the proximal end is connected to the body and the distal end is connected to the rotor housing. Each rotor may also be connected to a power system that is disposed within the inner cavity. According to many embodiments, the air transport vehicle also has a first rear rotor having a rotor housing and is disposed at a predetermined distance from the back portion of the body and connected to an elongated support shaft having a first end and a second end wherein the first end is connected to the body and the second end is connected to the rotor housing. The rear rotor is also connected to the power system. The air transport vehicle, according to many embodiments also includes a controller system disposed within the inner cavity and in electronic communication with the plurality of side rotors and the first rear rotor and configured to coordinate a rotational moment of each of the rotors thereby producing a corresponding thrust such that the transport further comprises a vertical motion and a horizontal motion. The vertical motion may be controlled by a vertical thrust generated by at least the plurality of side rotors. The horizontal motion may be controlled by a thrust generated from a group consisting of the first rear rotor and the coordinated rotation of the plurality of side rotors, wherein the airfoil further generates a lift force during the horizontal motion.

In other embodiments, the air foil also may be composed of a first and a second airfoil opposingly disposed within the slotted opening and wherein each of the first and second airfoils are rotatably connected to the body thereof and further connected to a mechanical drive system configured to receive control inputs from the controller system and translate the control inputs into a coordinated rotational movement of each of first and second airfoils such that the air foils may be disposed in a deployed configuration and a stored configuration. The air foils in the deployed configuration are positioned such that the cross section of the air foil is poised to generate lift during the horizontal motion. The air foils in the stored configuration are positioned such that no lift is generated by the cross section thereof.

In still other embodiments, each of the plurality of side rotors are rotatable about a fixed axis that runs perpendicular to a longitudinal axis of the body wherein the rotation thereof is capable of producing a thrust vectoring of the rotors.

In yet other embodiments, the first rear rotor is rotatable about an axis perpendicular to the support shaft such that the first rear rotor can produce a thrust vectoring according to a desired position of the first rear rotor, wherein the rotation thereof is controlled by a rotational motor in communication with the control system and wherein the position of the first rear rotor is controlled by the control system.

In still yet other embodiments, the rotational motor is disposed within the body and connected to the first rear rotor at a pivot point located at the second end of the elongated support shaft.

In other embodiments, the rotational motor is disposed at the second end and enclosed within the rotor housing.

In still other embodiments, the inner cavity is configured to accommodate a human being.

In yet other embodiments, the air transport vehicle also includes an access door wherein the access door is disposed on the front portion of the transport and connected to the body thereof by a means selected from a group consisting of hinges and sliding mechanisms.

In still yet other embodiments, the air transport vehicle also includes access panels wherein the access panels operate to allow access to the internal components of the transport.

In other embodiments, the access panels are disposed in a position on the body selected from a group consisting of the bottom portion and each of the side portions.

In still other embodiments, the air transport vehicle includes a ducted shroud disposed on each of the plurality of side rotors and the first rear rotor wherein the ducted shroud has a variable cross section such that the loss of thrust at the rotor tips is minimized and the velocity of air flow of the rotors is maximized.

In yet other embodiments, the air transport vehicle includes at least a second rear rotor disposed in parallel to the first rear rotor on the opposing side of the longitudinal axis of the body.

In yet still other embodiments, the shroud is formed into a fixed single wing that is configured to generate lift.

In other embodiments, each of the first and second rear rotors are rotatable about an axis perpendicular to the support shaft such that the first and at least second rear rotor can produce a thrust vectoring according to a desired position of the rear rotors, wherein the rotation thereof is controlled by a rotational motor in communication with the control system and wherein the position of the rear rotors is controlled by the control system.

Many embodiments include a method for controlling an air transport vehicle including a multirotor fixed wing transport vehicle. Many embodiments may include obtaining a multirotor fixed wing transport according to the various embodiments described herein. A desired position input for the multirotor fixed wing transport may be generated before and/or during flight. A desired attitude for the multirotor fixed wing transport may also be generated. The desired position may be transmitted to a position controller wherein the position controller translates the position input into a velocity component input to generate a corresponding force feedback input. The desired attitude and generated force feedback may be combined in a force allocation module and generating an attitude input for an attitude controller wherein the attitude controller generates a desired wrench input into a rate controller; the rate controller translates the desired wrench into a force moment input for a moment allocation module. Additionally, the force moment input and force feedback from the force allocation module may be combined into a control allocation module. Subsequently, the control allocation module may allocate appropriate force generation voltages to the plurality of side and rear rotors.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 1A illustrates a top view of an aerodynamic body of an air transport vehicle according to an embodiment of the invention.

FIG. 1B illustrates a side view of an aerodynamic body according to many embodiments.

FIGS. 2A and 2B illustrate a side and top view of an air transport vehicle with wings according to an embodiment of the invention.

FIGS. 2C and 2D illustrate a front and perspective view of an air transport vehicle with wings according to an embodiment of the invention.

FIG. 3A Illustrates a side view of an air transport vehicle with wings and propulsion systems according to an embodiment of the invention.

FIG. 3B illustrates a top view of an air transport vehicle with wings and propulsion systems according to an embodiment of the invention.

FIGS. 3C and 3D illustrate a front and perspective view of an air transport vehicle with wings and propulsion system according to an embodiment of the invention.

FIGS. 6A to 6D illustrate various views of an embodiment of the invention with ducted rotors.

FIG. 9 illustrates a top view of an embodiment of the invention.

FIG. 12 illustrates a perspective view of an embodiment of the invention with an access door.

DETAILED DESCRIPTION OF THE INVENTION

Figure 1C:
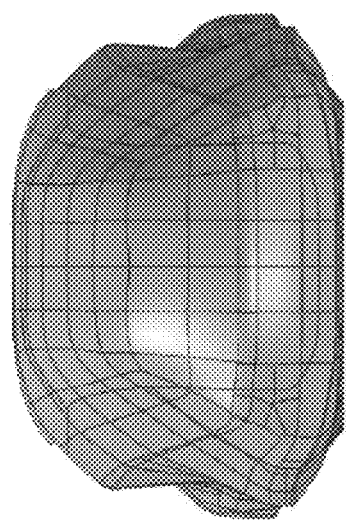
FIGS. 1C and 1D illustrate a front and perspective view of an aerodynamic body according to an embodiment of the invention.

Turning now to the drawings, air transport vehicle systems and methods of controlling automated air transport vehicle systems in accordance with various embodiments of the invention are illustrated. In several embodiments the air transport system includes multiple side rotors that are configured to generate lift in a vertical takeoff scenario. Additionally, the side rotors in various embodiments can operate to propel the air transport vehicle forward for forward flight. In a number of embodiments, the air transport vehicle also includes rear rotors. In some embodiments the rear rotors may operate to provide forward thrust or may operate to also provide lift to the vehicle. In some embodiments one or more of the rotors may be configured to tilt, thereby creating a thrust vectoring capability to help propel the air transport vehicle both vertically and horizontally. In many embodiments the air transport vehicle possesses some form of a fixed wing. The fixed wing helps the air transport vehicle to take advantage of the lift properties of an air foil that allow traditional fixed wing aircraft to have longer more efficient sustain flights. In a number of embodiments, the fixed wing portion may be designed to be retractable on either side of the body of the air transport vehicle thereby allowing the footprint of the vehicle to be reduced and allow the air transport vehicle to enter into a variety of situations. Having an air transport vehicle with both multiple rotors and a retractable fixed wing portion can eliminate the need for long runways and allow the vehicle to enter into some areas not otherwise accessible by traditional aircraft.

In a number of embodiments, the body of the air transport vehicle may be bio inspired to reduce drag and improve the lift capabilities of the air transport vehicle. For example, in some embodiments the body may take on a shape similar to a box fish where the front portion is blunter with the tail having a more tapered shape. The profile of the body, in many embodiments, may resemble the profile of a box fish which in many ways may exhibit similar lift characteristics to an airfoil. However, the size of the interior shape may be conformed to accommodate a variety of payloads that include but are not limited to humans. The ability to carry the payload inside the body of the vehicle allows the design of the body to be optimized for aerodynamic function irrespective of the payload. Thus, many embodiments may be capable of longer more efficient flights with the payload adding little strain to the power and controls systems on the vehicle. Additionally, many embodiments may position the rotors below the body of the vehicle altering the center of gravity further improving on the aerodynamics of the overall air transport vehicle.

In a number of embodiments, control systems are utilized in conjunction with one or more power systems and/or one or more sensor systems to allow for autonomous flight capabilities.

In several embodiments, the air transport vehicle system is configured as a medical air transport vehicle system. Medical air transport can play an important role in expanding critical care capabilities of emergency medical services (EMS) by providing higher level care at the scene as well as expedient access to trauma centers. Many factors influence a dispatcher's decision to employ either a fixed wing aircraft or medically outfitted helicopter, with the primary objective of providing the appropriate level of triage, whilst safeguarding crew and patient. Weather, air-traffic patterns, distance to the nearest trauma center, and/or practical access to the nearest trauma center (i.e. access to nearby airstrip, or helipad) can all influence the likelihood and type of dispatch.

Subjective protocols and trainings are often used to attempt to best determine the necessity of air EMS, balancing the need of rapid care with the severity of outcome, risk, and cost, for both crew and patient. In many instances, air EMS are employed when a ground-based service is deemed inappropriate (i.e. too slow, no access, or both). Due to the cost and requirement of infrastructure, air EMS is considered a second, albeit, effective option. There exist two primary options within an air ambulance class: a specially outfitted helicopter (MEDEVAC in military parlance) and a medically-equipped fixed wing aircraft. Helicopters are range-limited while fixed wing aircraft can require nontrivial infrastructure (e.g. airstrip) to take off and land. Additionally, most current airborne ambulance vehicles are human operated, which can expose them to human error, human fatigue, and/or require additional time for briefing and boarding operations.

A flying automated ambulance, according to various embodiments of the invention, may help to bolster existing EMS protocols by providing a more objective toolset, namely a medical transport vehicle that is aware of its capabilities far in advance of an emergency and free from in-situ dispatcher and pilot judgement. This can include (but is not limited to) autonomous "decision-making" regarding weather adjustments, ground and air traffic, location of the nearest appropriate trauma center, and fastest and safest trajectory to and from a trauma scene. Furthermore, various embodiments can involve the use of redundant propulsion systems to increase flight stability that may aid in the ultimate deployment and recovery missions that an automated ambulance or air transport vehicle may be used for.

Furthermore, flying automated ambulances in accordance with several embodiments of the invention may help avoid drawbacks of traditional aircraft by combining the strengths of a helicopter and fixed wing aircraft in one practicable vehicle: access and range, respectively. For example, fixed winged aircraft require geo footprints that can consume large areas of land. Likewise, helicopters have the drawback of not being capable of longer sustained flight as well as reduced altitude limits. However, combining the strengths of the two systems can help to overcome some limitations. The air transport vehicle, in accordance with many embodiments of the invention can take-off and land at existing medical helipad infrastructure, while like a fixed-wing aircraft, the air transport vehicle can offer greater potential in speed and range. The air transport vehicle in accordance with many embodiments of the invention can efficiently package the advantages of fixed wing and rotary wing aircraft in a singular, well-equipped hybrid-vehicle, whose complementary design can expand the use of air EMS. A morphing shape in combination with a multitude of smaller rotors, instead of one large one can help create a small footprint that may allow the air transport vehicle to operate in areas that may otherwise be difficult to reach.

Turning now to the drawings, many embodiments described herein are directed to various air transport vehicles that combine the benefits of fixed and rotary winged aircraft with improvements thereupon to expand the potential uses and capabilities of the air transport vehicles. For example, FIGS. 1A to 1D illustrate an aerodynamically shaped body of an air transport vehicle 100 In accordance with many embodiments the body of the air transport vehicle may have a bio inspired shape. For example, the profile illustrated in FIG. 1B shows a body with a front portion 120 that may be blunt and the top portion 125 may be rounded with a tapered rear portion 140. Such profile may be similar to that of a box fish or any number of bio related objects. The side view provides a view of an insert 110 or opening where wings may be stored and subsequently deployed therefrom during the flight of the air transport vehicle. While the illustrated wings are shown as retractable, air transport vehicles in accordance with many embodiments of the invention may include permanently fixed wings or permanently deployed wings and/or lack wings as appropriate to the requirements of a given application. In reference to the term wings, many embodiments are directed to a body that is shaped to act as an airfoil. The description of various wing configurations is discussed below with reference to a number of the subsequent figures.

FIG. 1B also illustrates various mountings 130 from which a variety of propulsion systems may be installed according to various embodiments of the invention. According to many embodiments, the number of side rotors may be as little as 4 up to as many as may be desirable for the respective size of the body 100. For example, the embodiments illustrated herein show at least six side rotors disposed along the sides of the air transport vehicle. The spacing of the various rotors may also be modular, in accordance with many embodiments. For example, the mounting positions 130 are not evenly spaced. The rear most position is not spaced equally as the front two positions. According to various embodiments, the modularity of the rotor mounting may allow for the rotors to be mounted such that the function of the rotor does not interfere with the function or lift of the fixed wing.

The shape of the body 100 can improve the lift generated during forward movement of the air transport vehicle. For example, the swooped profile of the air transport vehicle body 100 may resemble that of a box fish or even that of a wing. The blunter front portion 120 and the tapered back portion 140 may allow for improved aerodynamic flow over the body of the air transport vehicle while providing significant interior space for carrying payload. It will be further illustrated herein that the body may add to the overall lift of the air transport vehicle and reduce the drag. It would be well understood by one of ordinary skill in the art that improved lift and decreased drag on any air vehicle may be desired elements of any design.

Figure 1D:
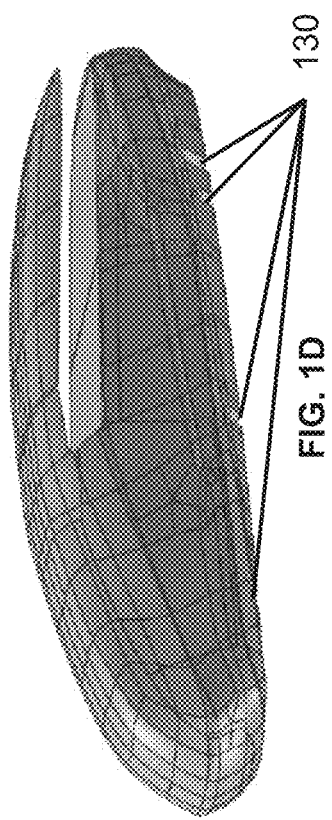

Air transport vehicles in accordance with many embodiments of the invention can provide modularity. For example, FIGS. 1B, 1D, and 2A illustrate a variety of mounting positions 130 located along the length of the body 100. For example, the mounting positions may be used to mount a propulsion system so as to provide lift and thrust to the flight of the air transport vehicle. Various propulsion systems that can be utilized by air transport vehicles in accordance with a number of embodiments of the invention are discussed further below.

Turning now to FIG. 2, an air transport vehicle having a fixed wing portion 210 in accordance with an embodiment of the invention is illustrated. A fixed wing according to traditional aircraft is one in which the wing(s) are in a fixed position during flight. The wing is a portion of such fixed wing aircraft that act to produce lift for sustained flight. The fixed wing is in contrast to a rotary winged aircraft in which the wing spins about an axis to generate the lift necessary for flight; similar to a helicopter. The embodiment illustrated in FIGS. 2A-2D is an aerodynamically designed body 100 with a fixed wing 210 capable of producing lift. According to many embodiments, the wing portion 210 may be rotatable about an axis 220 such that the wing may have a variety of positions the rotation of which may be operated by a motor (not shown) connected to a power system (not shown) and a control system (not show). For example, FIG. 2B illustrates the wings 210 in a deployed position such that the wings 210 are positioned mostly perpendicular to a longitudinal axis of the body 100 of the air transport vehicle. In accordance with various embodiments, the deployed position of the wings may aid in increasing the lift capacity of the air transport vehicle which can aid in prolonged sustained flight. Such embodiments may improve the efficiency of flight for a variety of applications. FIGS. 2C and 2D illustrate additional views of the wings 210 in a deployed position.

As with any aircraft, air transport vehicles in accordance with many embodiments of the invention may have a plurality of propulsion systems. For example, FIGS. 3A to 3D illustrate an exemplary embodiment of an air transport vehicle with both a fixed wing and rotary winged components. In FIG. 3A it can be illustrated that the body of the air transport vehicle may have a rear propulsion system that includes rear rotors 310, a motor 320, and a support shaft 340 located at the rear of the body. Additionally, the body may be equipped with a vertical propulsion system that has horizontally oriented side rotors 330. There may be a number of side rotors 330 positioned along the length of the body. Such propulsion systems may be configured to act in conjunction with the lifting effects of the fixed wing portion 210 to improve the overall fight characteristics of the air transport vehicle.

The physical layout of side rotors of an air transport vehicle in according with an embodiment of the invention is illustrated in FIG. 3B. It can be seen that each of the side rotors 330 may be positioned at different locations along the length of the body of the air transport vehicle. The positioning of the side rotors 330 may vary depending of the overall design of the wings 210 and the body 100. For example, the embodiment illustrated in FIG. 3B shows at least six side rotors 330 positioned in different locations along the length of the body. The distance between the front side rotors 330A and the back side rotors 330B may vary to accommodate for the deployed wings. For example, the positioning of the side rotors may be configured such that the rear most side rotors 330B will not interfere with the lift properties of the wings 210 during flight. As will be illustrated later, the side rotors, when in significant operation may disrupt the airflow patterns beneath the wings thus reducing the overall lift capabilities of the air transport vehicle. Thus, modularity of the side rotors 330 can accommodate the application of a fixed wing portion in conjunction with a rotary winged portion.

In accordance with many embodiments, the side rotors may perform two key functions of the air transport vehicle. The first function being vertical takeoff and landing. The side rotors, may perform similar to that of a single rotor on a traditional helicopter or the plurality of rotors as seen on a quad copter. The rotation of the side rotors may act to generate lift and propel the air transport vehicle vertically into the air in preparation for horizontal flight. Additionally, the rotors may be configured to act independently to alter the pitch, yaw and roll of the air transport vehicle. In many embodiments, the side rotors are controlled by a control unit (not shown) to perform the functions of vertical takeoff, horizontal flight, flight maneuverability, and vertical landing. The use of vertical propulsion systems allows the air transport vehicle to take advantage of the strengths of a helicopter by reducing the footprint of the deployment location. In accordance with many embodiments, one or more of the side rotors 330 may be configured to rotate about an axis parallel to the support shaft of each of the rotors as indicated by the rotational arrows in FIG. 3A. Although not shown, the air transport vehicle may be configured with additional drive mechanisms to rotate the side rotors 330 to alter the lift and thrust capabilities of the air transport vehicle, thus aiding in a more sustained and stable flight.

In accordance with many embodiments, the air transport vehicle may have an additional set of rotors positioned at the rear of the vehicle. As illustrated in FIGS. 3A and 3B the rear rotors 310 may be positioned at the rear of the air transport vehicle. The rear rotor positioning may vary depending on the overall thrust requirements for the air transport vehicle. The rear rotors, as illustrated in FIGS. 3A and 3B may be positioned such that the rotational axis of the rotors is parallel to the longitudinal axis of the body 100. Such positioning would allow the rear rotors to provide forward thrust or rearward thrust. As positioned in FIGS. 3A and 3B, the rear rotors may be configured to assist or replace the function of the side rotors for horizontal flight. The rear rotors 310 may be configured to provide enough thrust that, once operational, the power to the side rotors may be reduced or eliminated during horizontal flight, thus taking full advantage of the lift properties of the fixed wings.

Although only two rear rotors are illustrated, it may be understood that any number of rear rotors may be used to generate the desired force necessary for the air transport vehicle. Although a certain rotor configuration is illustrated in FIGS. 3A-3D, it should be understood that the position of the rotors and their relative thrust vectors can be adjusted depending on the desired flight characteristics. For example, in some embodiments the change in rotational speed of the rotors may adjust the pitch, yaw, and/or roll of the vehicle that may allow for transition from vertical to horizontal flight. However, in other embodiments the angle of one or more of the rotors with respect to the longitudinal axis of the body of the vehicle may be adjusted or rotated to provide additional horizontal thrust for horizontal flight thereby increasing the lift capabilities of the wings and aerodynamically shaped body.

Figure 4A:
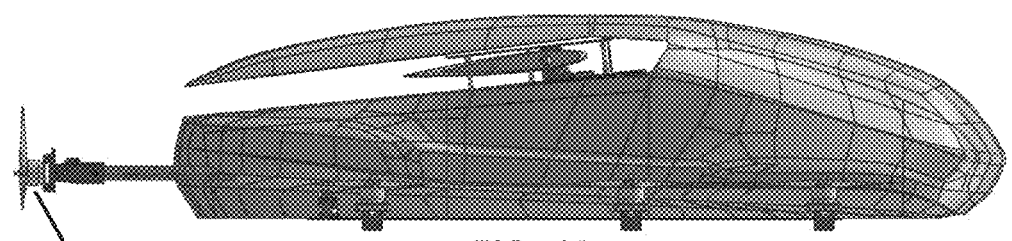
FIGS. 4A to 4C illustrate the variable positioning of a portion of the propulsion system according to some embodiments
Figure 4B:
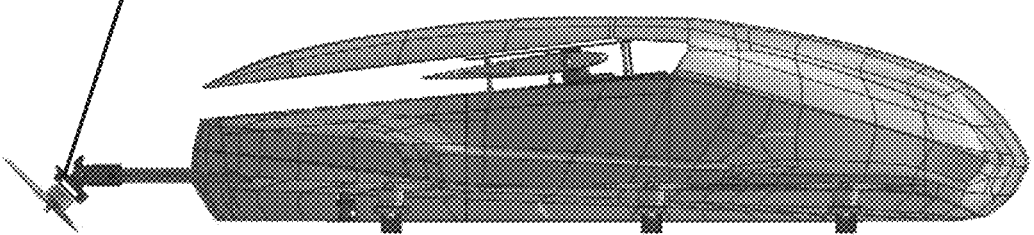
Figure 4C:
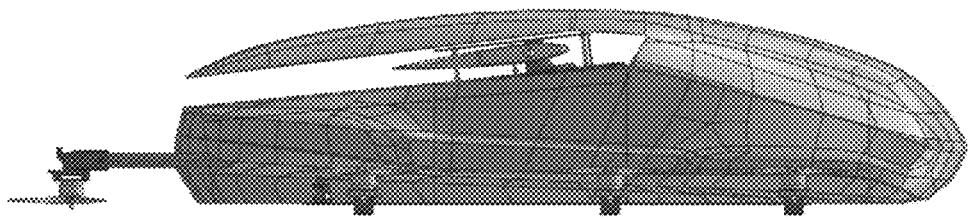

In accordance with many embodiments the rear rotors may also be adjustable. For example, FIGS. 4A to 4C illustrate several positions that the rear rotors 310 may take in order to improve the overall flight capabilities of the embodiments of the air transport vehicle. For example, FIG. 4A illustrates the rear rotors 310 in a vertical position, poised to produce a horizontal thrust for the air transport vehicle. Such configuration, as previously described, may be used in conjunction with or completely independent of the side rotors during horizontal flight.

FIG. 4B illustrates a transitional state of the rear rotor 310 that may be used for thrust vectoring. Thrust vectoring can be used to control or steer the air transport vehicle in a variety of positions. Such thrust vectoring can aid in improved flight characteristics and capabilities for the variety of environments in which such air transport vehicles may be utilized. For example, urban environments that may have a constantly changing landscape with other moving vehicles and humans, as well as fixed obstacles, can require improved flight capabilities through the use of thrust vectoring. Thrust vectoring may also be used to simply slow the air transport vehicle to a desired speed in any situation.

FIG. 4C illustrates the rear rotor oriented in a horizontal position similar to that of the side rotors. The horizontal position of the side rotor may be preferable in a variety of situations, such as for example, in the event of a rotor failure during flight. According to many embodiments, the horizontally positioned rear rotors may be used to provide vertical thrust for vertical takeoff and landing. The control of such systems in accordance with various embodiments of the invention is described further below.

Figure 5A:
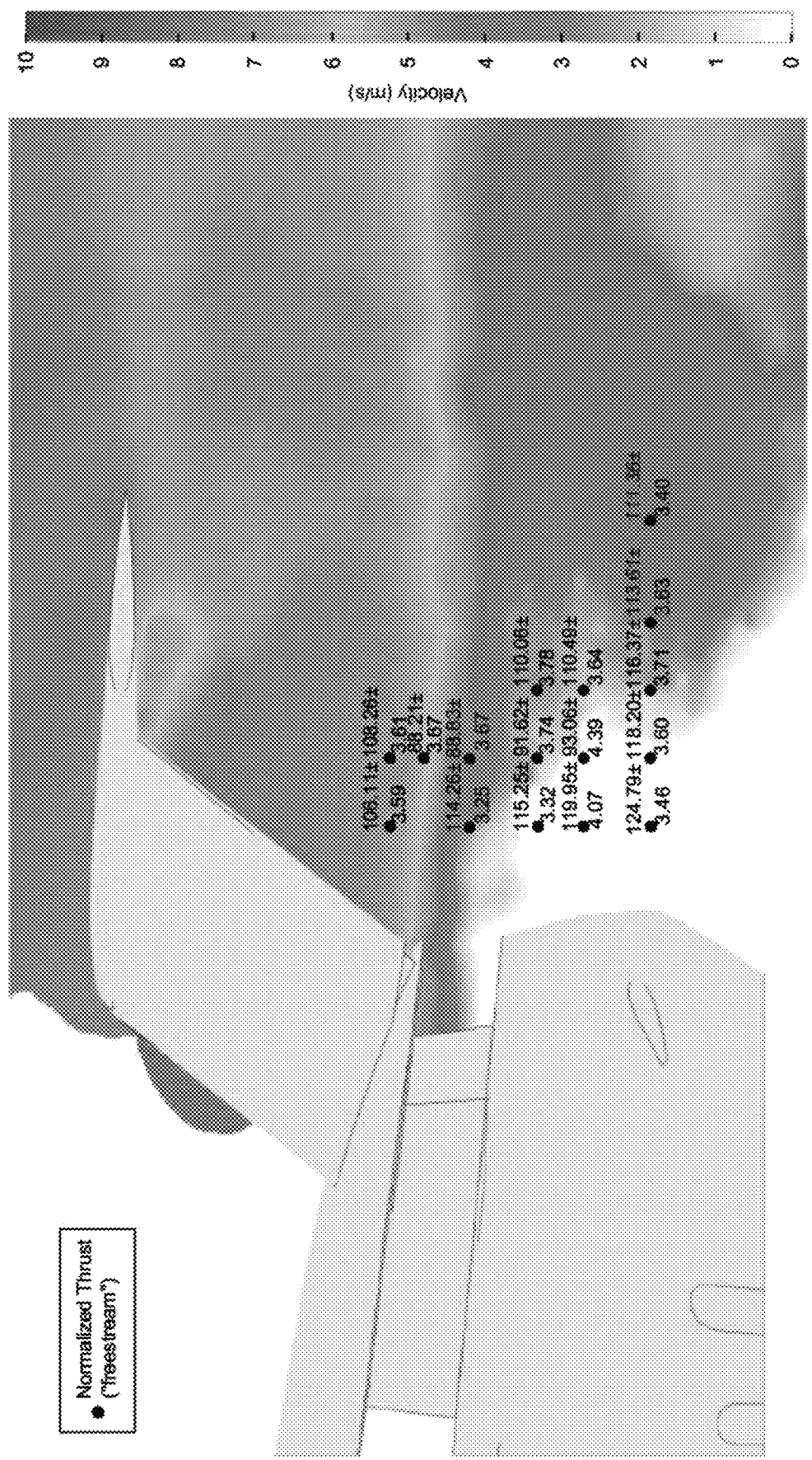
FIGS. 5A and 5B illustrate the respective thrust capabilities of a rear rotor based on placement according to many embodiments.
Figure 5B:
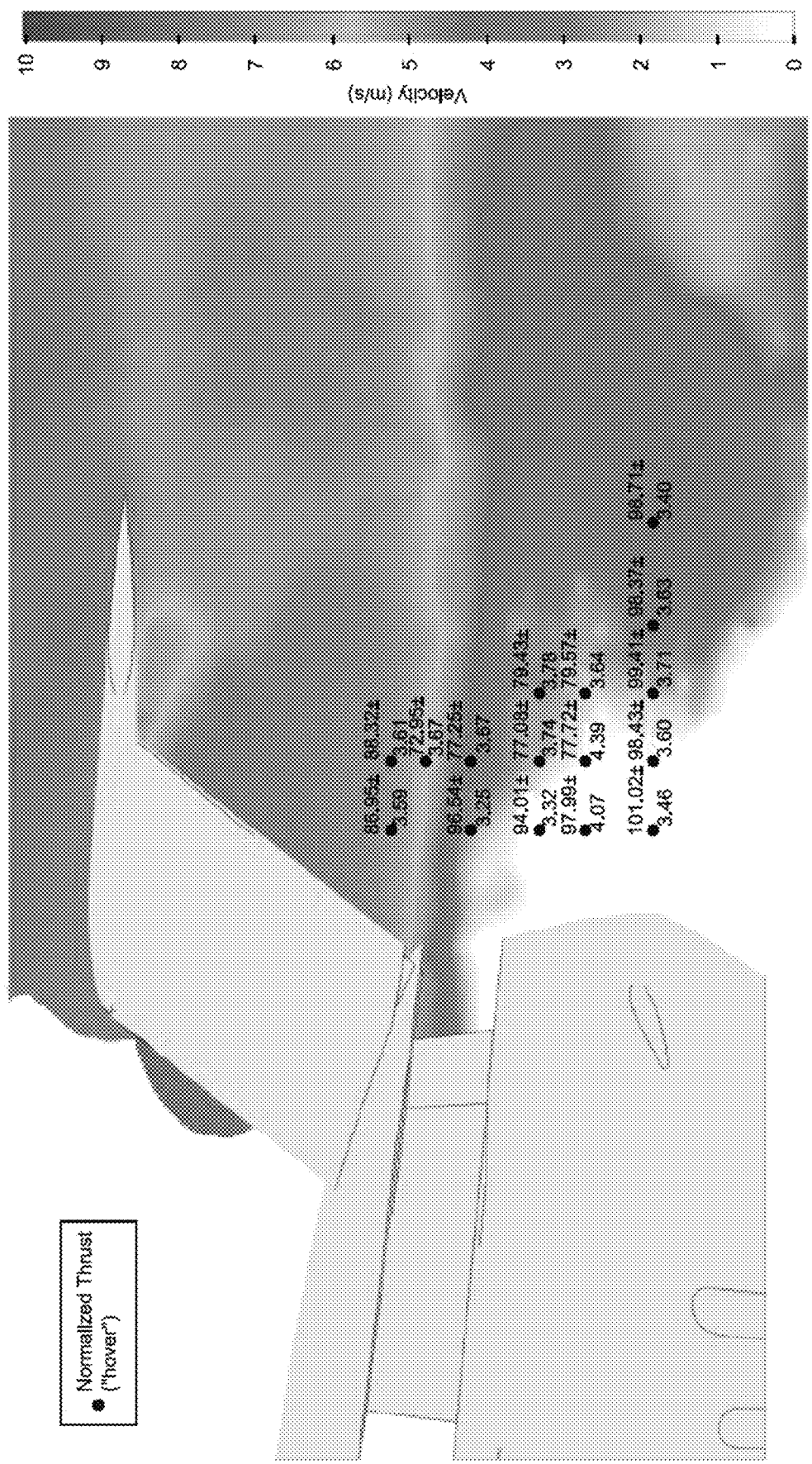

Turning back to the drawings, FIGS. 5A and 5B illustrate the relative thrust that can be generated by the rear rotors of an air transport vehicle in accordance with various embodiments of the invention. Having improved thrust characteristics from the rear rotors 310 may be desirable in any number of situations. Therefore, determining the best placement for such rotors can vary in many embodiments. For example, the numeric values in FIGS. 5A and 5B are representative of the thrust capabilities of the rear rotor with respect to the physical position near the rear of the air transport vehicle. FIG. 5A shows the respective normalized thrust values of the rear rotors while in a "freeform" configuration or in a forward movement. FIG. 5B illustrates the respective thrust values while the air transport vehicle is in a "hover" position. According to many embodiments the rear rotors 310 may be positioned closer to the rear of the air transport vehicle rather than further away to improve the overall thrust capabilities of the air transport vehicle. Many embodiments of the air transport vehicle may have the rear rotors 310 positioned in the wake of the body to increase the overall thrust performance of the rotors.

The placement of the rotors in the wake of the body operates on the principle of pressure and the pressure differential that occurs with rotors to create thrust. Tracing the pressures through the various stations of control volume indicates that the pressure difference across a disk of known area is directly related to the thrust it produces, which quantities are set due to the inlet and wake conditions. The thrust of a rotor is dependent on the pressure differential across the rotor itself. In accordance with many embodiments, the contour of the body is capable of reducing the pressure in the wake of the body and thus placing the rear rotors 310 in the wake can allow for a greater pressure differential across the rotor thus increasing its thrust capabilities. As can readily be appreciated, the specific placement of the rear rotors on an air transport vehicle in accordance with an embodiment of the invention typically depends upon the requirements of a given application.

Figure 6A:
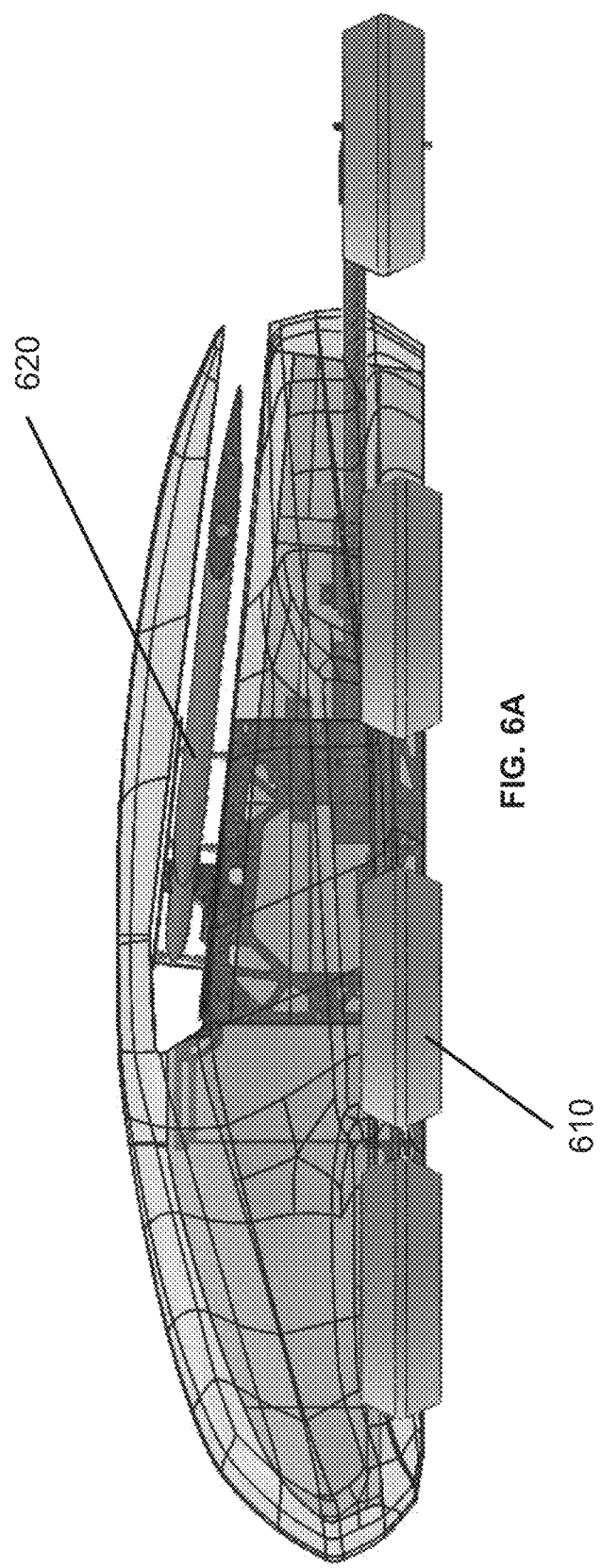
Figure 6C:
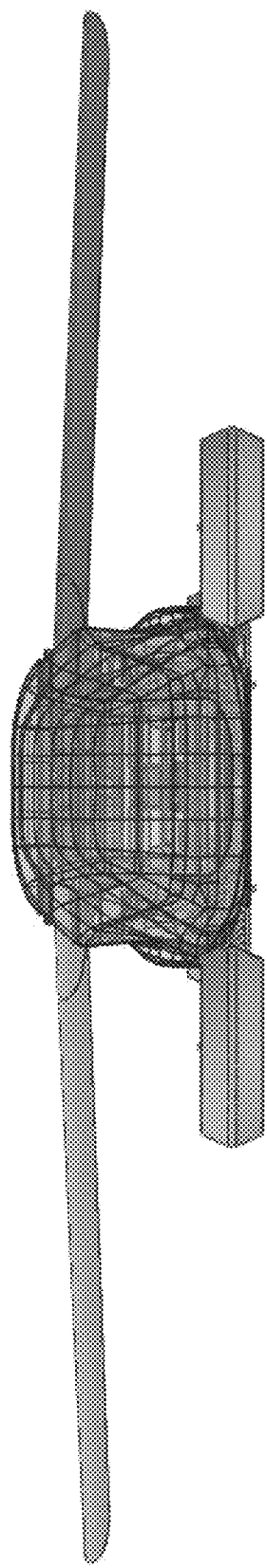
Figure 6D:
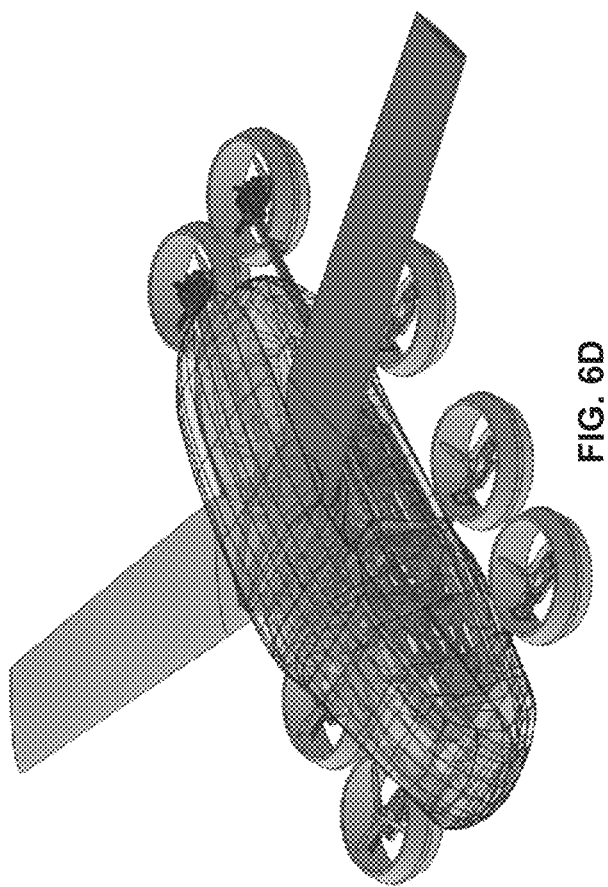

Aerodynamics plays a key element in any air transport vehicle design to help improve flight efficiency thus, increasing flight longevity. In accordance with some embodiments, the wings of the air transport vehicle may deploy in a more swept back configuration 620 as illustrated in FIGS. 6A and 6B. While not fully extended, the swept back design may also be capable of producing lift for sustained forward flight during the deployment of the air transport vehicle, thus, reducing the strain on the side rotors and ultimately increasing the life of the power system.

In other embodiments, the rotors 310 and 330, may be configures with shrouds 610. The shrouds, 610 may be designed to aid in the directional flow from the rotors. In other words, the shrouds effectively produce a ducted rotor configuration which may reduce noise as well as increase the thrust capabilities of the rotors. For example, the ducted rotor can help to reduce the loss of thrust from exposed tips of the rotors. Additionally, many embodiments may have ducts with varying cross sections to help improve the velocity and pressure of the airflow over the rotors thus, improving the thrust capabilities of the rotors. In accordance with many embodiments, the varying cross section of the ducts may also result in a more aerodynamically compliant design to help reduce the drag that may naturally be seen from adding a duct to the rotors.

Figure 7:
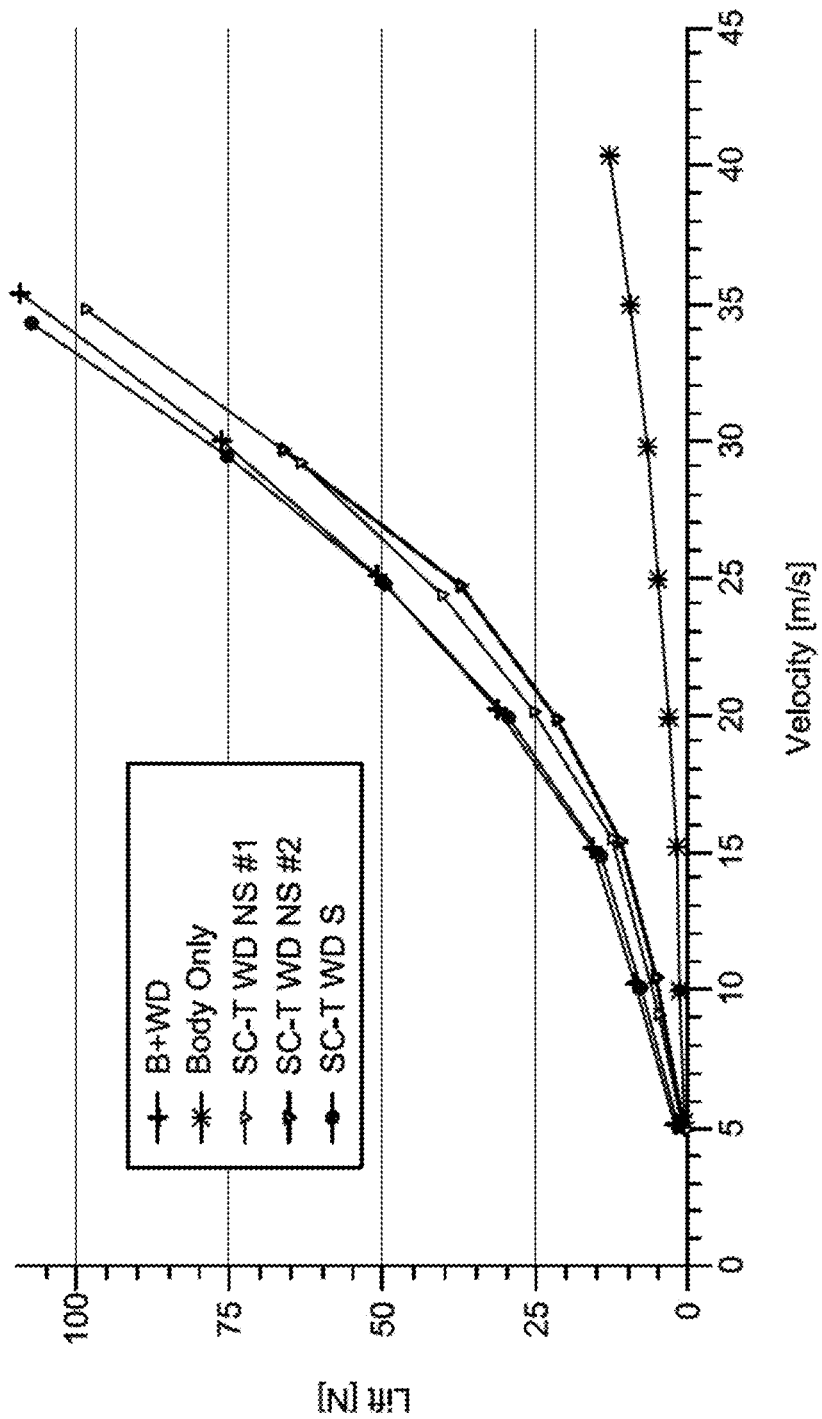
FIG. 7 illustrates the respective lift capabilities according to many embodiments.
Figure 8:
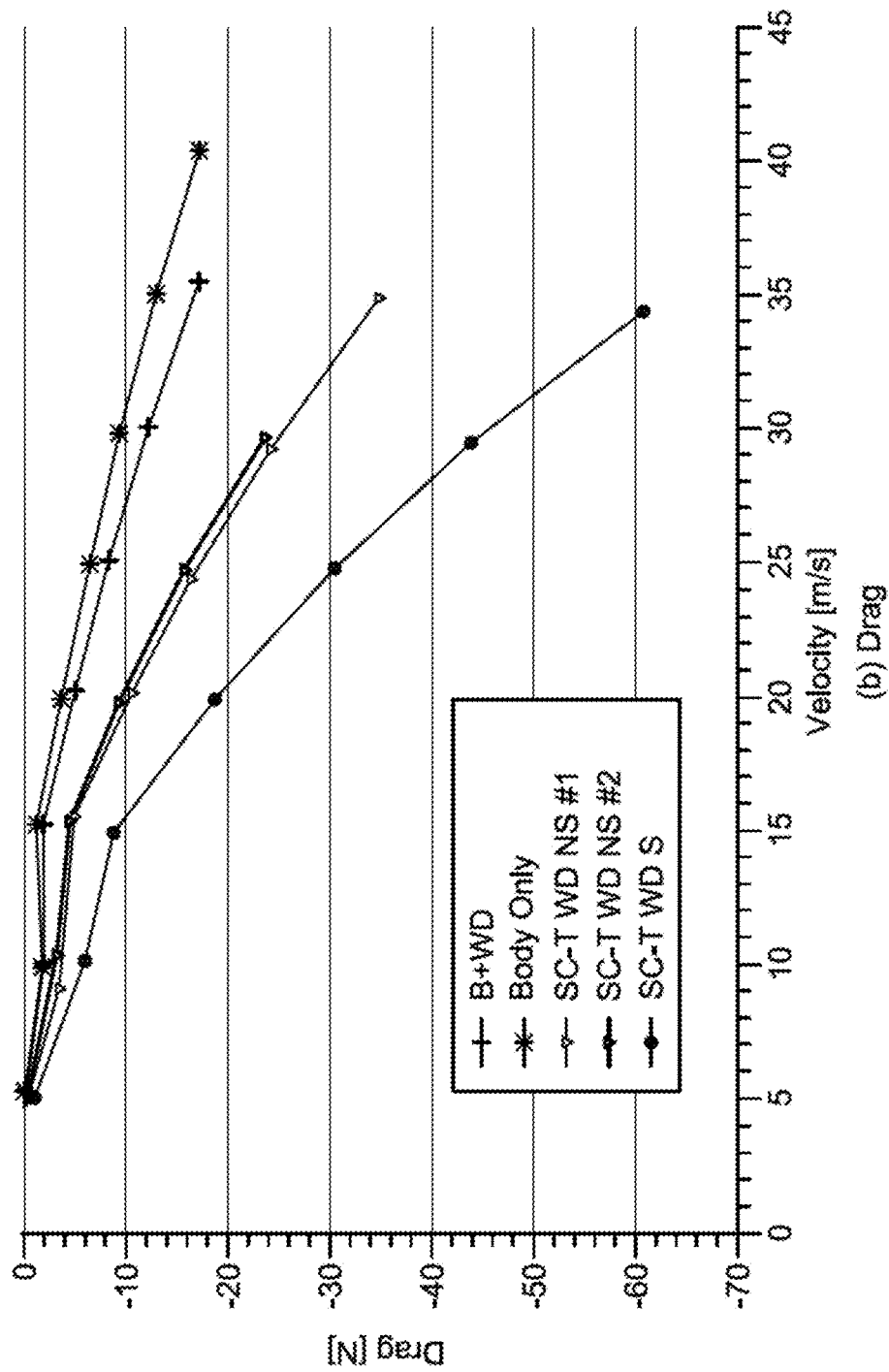
FIG. 8 illustrates the respective drag characteristics of many embodiments.
Figure 10A:
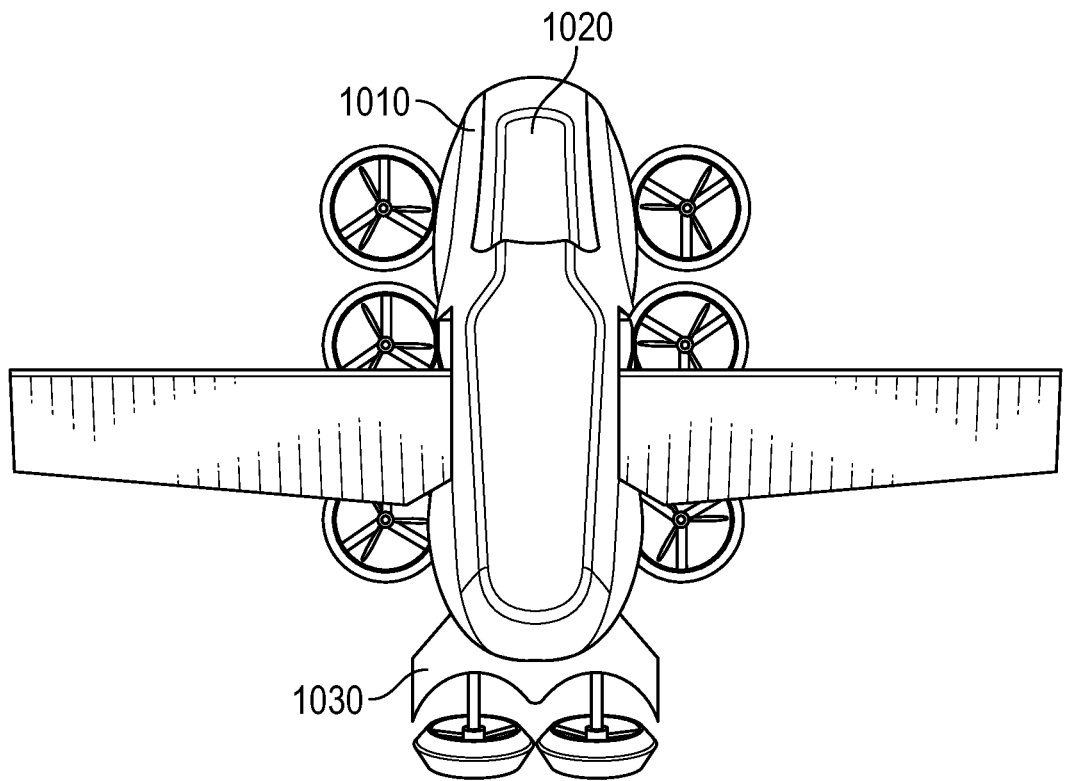
FIGS. 10A and 10B illustrate a top and side view of an air transport vehicle with deployed wings according to various embodiments.
Figure 10B:
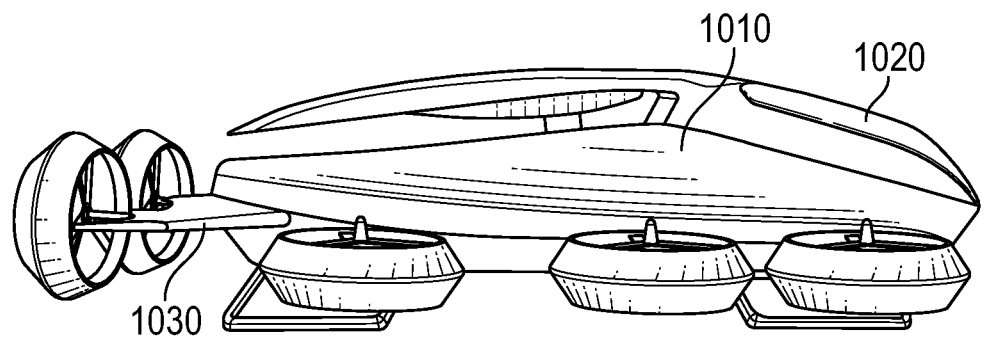
Figure 11A:
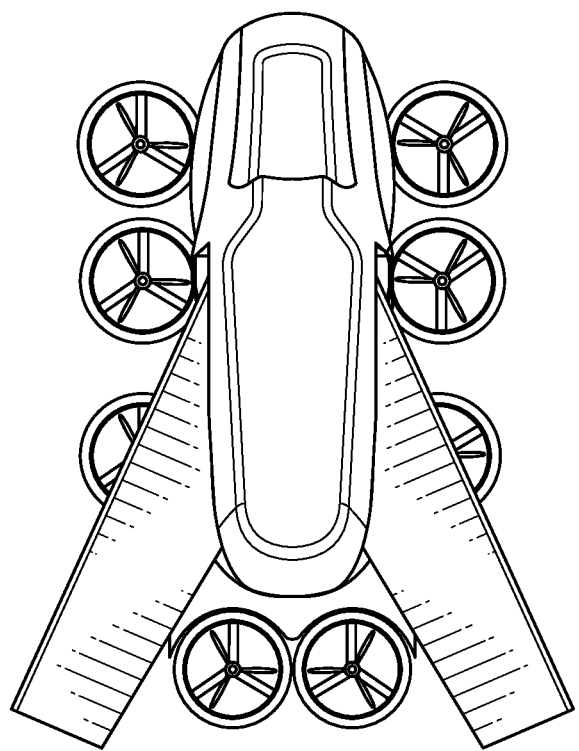
FIGS. 11A and 11B illustrate a top and side view of an air transport vehicle with stowed wings according to various embodiments
Figure 11B:
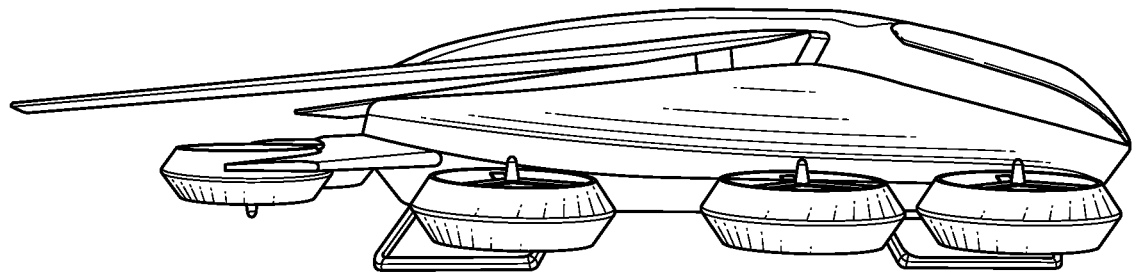

The graphs shown in FIGS. 7 and 8 illustrate that air transport vehicles in accordance with various embodiments of the air transport vehicle can affect overall lift and drag experienced during flight. For example, FIG. 7 illustrates that the body alone may be designed to generate some lift which can ultimately aid in the overall flight capabilities. Furthermore, the addition of shrouds (SC-T WD S) does not adversely affect the lift capabilities of the air transport vehicle. In contrast however, the graph in FIG. 8 illustrates the inclusion of the shroud can dramatically increase the amount of drag on the air transport vehicle.

In accordance with some embodiments, the shrouds may be enclosed in a secondary wing structure 910 as illustrated in FIG. 9. In accordance with many embodiments, the secondary wing 910 may be configured to shroud the rotors, thus improving their thrust as well as generating lift with a proper contour and reduce the drag effect from the shrouded rotors. In accordance with many embodiments the wing 910 may be configured to allow the rotors to still rotate with respect to the support shafts to aid in the forward flight of the air transport vehicle. In accordance with some embodiments, the secondary wing 910 may be the only wing of the vehicle. In other words, some embodiments may incorporate a fixed wing that is configured to generate vertical lift while simultaneously housing a plurality of rotors capable of generating the vertical takeoff and horizontal thrust necessary to take advantage of the lift properties of the wing. In some embodiments the wing may be considered and extension of the main body of the vehicle.

In furtherance of improved aerodynamics of the air transport vehicle to improve flight capabilities, air transport vehicles in accordance with many embodiments of the invention are configured with a tail wing 1030. In accordance with some embodiments the tail wing 1030 as illustrated in FIGS. 10A-11B may be attached to the rear portion of the body. During flight of an air transport vehicle, it is important to maintain the wrench and moments that are naturally generated by the flight of the air transport vehicle. The wrench refers to the combination of a force vector and a couple or torque vector in parallel which generate a wrench space. The control of the wrench space is ultimately managed by maintaining the overall pitch, yaw, and roll of the air transport vehicle during flight. In accordance with many embodiments, the flight characteristics, specifically the pitch of the air transport vehicle, can be maintained better with a tail wing. The addition of a tail wing can allow for improved dampening of pitch moments and yaw stability and thus allow the air transport vehicle to increase its speed capabilities. In accordance with many embodiments the air transport vehicle may be capable of cruising at speeds of 25 m/s. Although a certain tail wing configuration is illustrated, it should be understood that any configuration may be used that will provide desired control of the air transport vehicle.

In accordance with many embodiments, the main body 100 of the air transport vehicle may be configured with a cargo hold area 1010. The cargo hold area in accordance with some embodiments may be configured to air transport vehicle a human subject (not shown). In other embodiments, the cargo hold area may be configured to accommodate a variety of payloads including (but not limited to) small or medium packages, robotics or other mechanical components, medical supplies, personal items for personal delivery such a laptop, or any other package that may be suitable for the desired application.

Although not explicitly shown, the cargo hold area may run the length of the internal space of the body of the air transport vehicle. In some embodiments, the space may be configured with a variety of triage components that may be utilized to provide care to an injured subject. The cargo hold area 1010 in accordance with many embodiments and as depicted in FIGS. 10 through 12B may be configured with an access door 1020. In many embodiments, the access door 1020 may be located near the front of the air transport vehicle and configured to be aerodynamically contoured to conform to the overall shape of the body 100. In many embodiments the access door may be connected to the body by way of hinges or a sliding mechanism. Such hinges and/or sliding mechanism may be used to allow the access door to completely expose the cargo hold area 1010 to allow for easy access of the cargo; human or otherwise. In accordance with many embodiments, the cargo hold area 1010 may be configured with a restraint system such that the cargo may be securely positioned within the cargo hold area during the flight of the air transport vehicle.

In accordance with many embodiments, the body 100 of the air transport vehicle may be configured with access panels 1210 as illustrated in FIG. 12, that may allow access to the internal components of the air transport vehicle. Such access panels 1210 may be important to allow for maintenance of the air transport vehicle. In some embodiments the access panels 1210 may be located on the side of the body while in other embodiments the access panels may be located on the underside of the body. The access panels may be positioned in any location that provides adequate access for the user.

Figure 13:
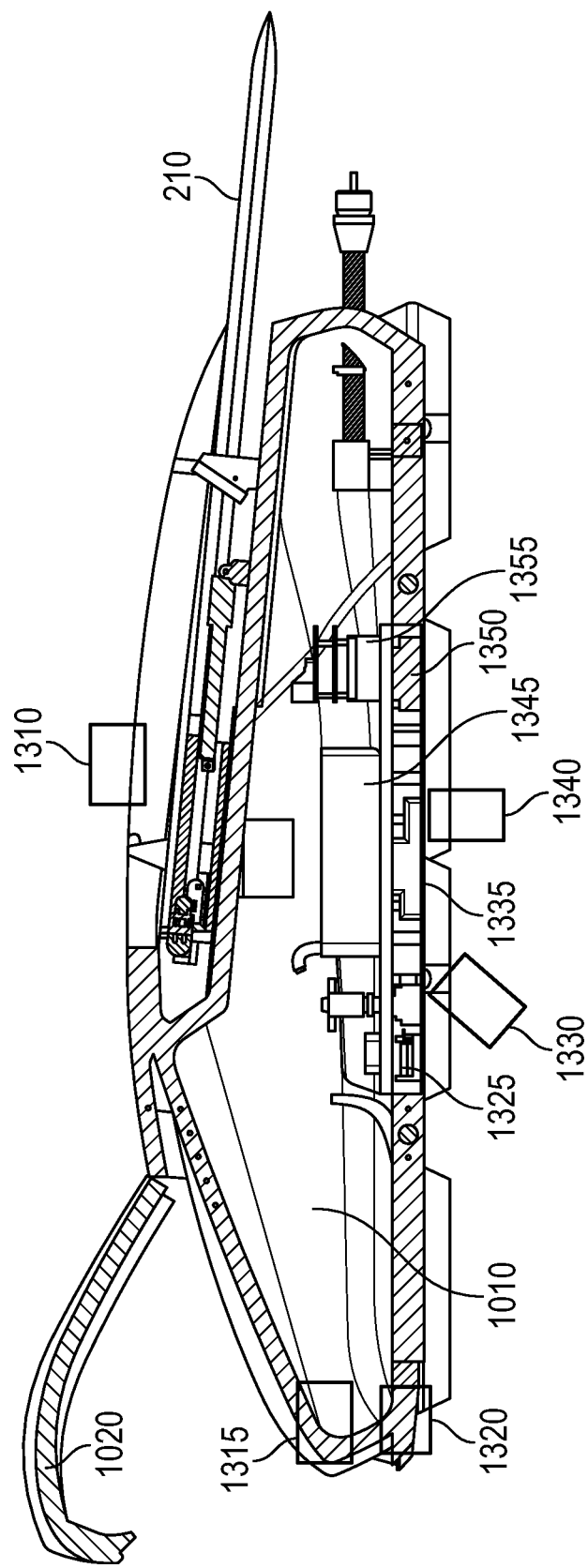
FIG. 13 illustrated a cross sectional view of an embodiment with various internal components.

In addition to carrying a human subject, many embodiments of the air transport vehicle will be configured to house certain necessary internal components such as a power system, a control system, and mechanical and/or electrical linkages connecting the power and control systems to the various external components such as the deployable wings, side rotors, rear rotors, and/or tail wing. Illustrated in FIG. 13 is a cross sectional view of an air transport vehicle according to an embodiment. In accordance with many embodiments the internal compartment of the air transport vehicle may house numerous components including but not limited to a main computer 1355 as well as electronic speed controllers 1325, flight controllers 1335, batteries 1345, a power management module, as well as various other flight imaging systems to aid in the autonomous flight controls of the air transport vehicle.

As it may be desirable to have the air transport vehicle operate autonomously, many embodiments may include a GPS unit 1310. In accordance with some embodiments the GPS unit 1310 may be located within the body of the air transport vehicle or may be located in any number of locations that allow the GPS unit 1310 to function as intended to provide guidance for the air transport vehicle.

In addition to a GPS unit 1310, many embodiments may include a variety of imaging systems and components that may work in conjunction with the GPS unit 1310 as well as the other control systems on board. For example, some embodiments may include a first person view camera 1315 that may allow a remote user to visually see the path view of the air transport vehicle while in flight or anytime the vehicle in in use. Other systems may include a stereo camera 1320 and/or a LIDAR system 1340. The stereo camera 1320 may operate to simulate a binocular view of a human. In other words, the stereo camera may aid in generating a three dimensional image of the surrounding terrain and coordinate the image with other control components such as the main computer 1355 and flight controller 1335 to adjust the flight path of the air transport vehicle.

The LIDAR system 1340 likewise may operate to generate three dimensional images of a specified target. For example, when in autonomous flight the air transport vehicle may receive target instructions of a particular person in a particular location. The LIDAR system 1340 may communicate with the main computer 1355, the stereo camera 1320, the flight controller 1335 and other controllers to generate a flight path to the target and to correctly identify the target for transport. The target, according to many embodiments may be a human or other payload such as a package. Other embodiments may include a monocular camera 1330 to aid in the autonomous flight of the air transport vehicle.

In accordance with various embodiments, the air transport vehicle may be powered by an electronic battery 1345 as illustrated in the embodiment in FIG. 13. The battery may be sufficient to operate all the electronic control systems as well as the variety of rotors necessary for flight. Additionally, the batter may be sufficient to operate the mechanical control systems connected to the wings 210 of the air transport vehicle that may be adjustable from a deployed to a non-deployed position as described earlier.

The autonomous vehicle, according to many embodiments, may require complex control software to adequately manage the flight of the vehicle through a variety of terrains and environments. Accordingly, the main computer 1355 may operate to receive input from each of the variety of input systems, including but not limited to the GPS unit 1310 and the variety of imagine systems (1315, 1320, 1330, and 1340) and translate that input into a set of controls for the rotors. For example, the main computer 1355 may communicate with the flight controller 1335 the necessary power and speed needed for each of the rotors in order to maintain stability by adjusting the pitch, roll, and yaw of the air transport vehicle. Subsequently the power control module 1350 and the electronic speed controllers 1325 may communicate and/or distribute the required outputs to the rotors to adjust the flight as necessary. The air transport vehicle may also be equipped with various cooling systems (not shown) to reduce the heat strain on the components and allow for efficient operation.

Many embodiments may implement a variety of control methods to properly control the flight of the vehicle. Some of the control methods and algorithms used within the main computer and other control systems may be further illustrated herein.

Embodiments of the Controls

Referring now to the aerodynamic performance and control of the air transport vehicle. In accordance with many embodiments, the air transport vehicle may be designed for both hover and sustained forward flight operations that increase the functionality and capabilities of the air transport vehicle in a variety of situations. Preserving the controllability of the air transport vehicle can be an important aspect of an air transport vehicle; especially when the air transport vehicle is used to move valuable cargo.

Figure 14A:
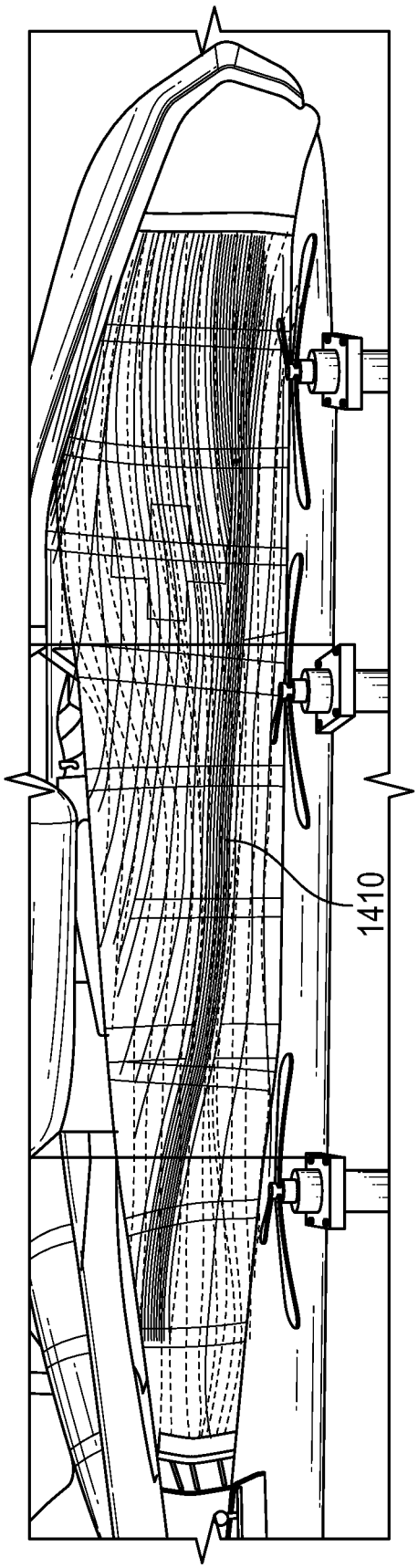
FIGS. 14A and 14B illustrate a tuft airflow test with respect to the body of the air transport vehicle.
Figure 14B:
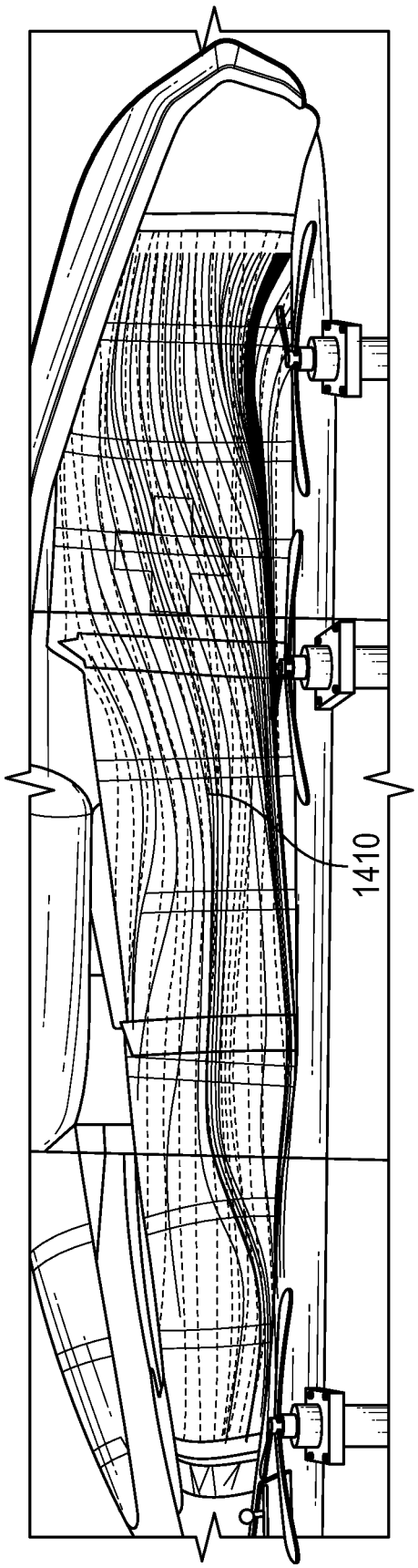

In many embodiments, it is important to maximize the aerodynamic performance to thus increase the capabilities of sustained flight. Such aspects may help to improve the range and efficiency of the air transport vehicle. For example, in many embodiments the air transport vehicle may be configured with multiple side rotors 330 as illustrated in FIGS. 1A through 6B. Such configuration of the side rotors can lead to a disruption of airflow characteristics while in a sustained forward flight configuration, such as for example when the wings 210 are in a deployed configuration. Illustrated in FIGS. 14A and 14B the airflow dynamics under the wings 210 and thus lift generated by the wings may be negatively affected by the actuation of the side rotors during flight. It can be illustrated by the directional flow lines 1410 in FIG. 14A that lift under the wing is maintained while the side rotors are static. However, in FIG. 14B illustrates the movement of the directional flow lines 1410 towards the rotors when actuated during forward flight thus potentially reducing the lift and increasing the drag on the air transport vehicle. Thus, adequate control of the rotors during sustained and hover flight can be necessary in many embodiments.

Typical drone or multi rotor vehicles that have been used in the industry are traditionally over actuated. This generally increases the robustness of the vehicle in the event of a rotor failure up to a certain degree. The key question is to what extent the vehicle remains controllable. As the controllability of an air vehicle is inherently tied to the design, it is important to design a system capable of maintaining control. For example, the control system may sacrifice yaw over pitch and roll to allow for continued flight in the event of a rotor failure. In traditional flight with rotor failure the yaw control is sacrificed over the pitch and roll control of the vehicle to allow the vehicle to be brought to a static hover for safe landing. The static hover or null controllability of a vehicle is desirable to increase the likelihood of safe emergency landing as well as the ability to regain total control over a vehicle in the event of a rotor failure.

Figure 15:
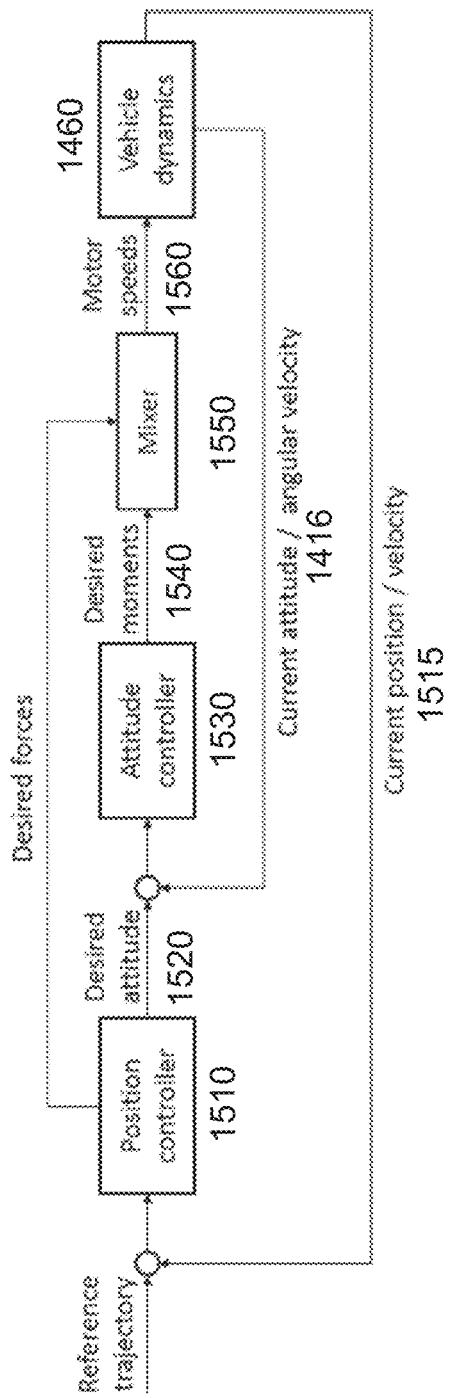
FIG. 15 illustrates a controller frame work according to some embodiments of the invention.

FIG. 15 illustrates a control system for multirotor vehicles in accordance with an embodiment of the invention. The system may contain two main components; the outer loop position controller 1515 and the inner loop attitude controller 1516, which runs faster than the outer loop. In traditional multirotor vehicles the position dynamics 1560 of a collinear multirotor vehicle are governed by the attitude. Under the control system of FIG. 15, the position controller 1510 computes the desired thrusts and attitude 1520 and the attitude controller 1530 computes the desired moments 1540 based on the desire attitude 1520. Ultimately, when considering the desired forces and moments individually the motor speeds 1560 can then be generated to control the vehicle dynamics 1560. The overall design of an air transport vehicle according to various embodiments may utilize the control system described in FIG. 15 while taking into account the desired characteristics of wrench, force, or moment within the task space or the changing boundaries defined by the mission requirements of the system.

In accordance many embodiments, the overall design of the air transport vehicle aims to optimize and stabilize the attitude dynamics of the vehicle. Typical application of the control method illustrated in FIG. 15 utilizes raw control inputs that are motor voltages that translate into rotational motor speeds, therefore the moment generated by each motor is directly proportional to its rotational speed squared. Even though the control system of FIG. 15 treats moment as a control input such input may be mapped into actual motor speeds to be able to control vehicle maneuvers thus the ultimate control is based on the physical bounds of the velocity of the motors with the ultimate goal being to determine the optimal velocity to generate the desired wrench of the air transport vehicle. In many embodiments, the application of the control system in FIG. 15 can be used to enable the controllability of an air transport vehicle during a rotor failure. When a rotor failure occurs, the ability to engage the rear rotors in a vertical thrust scenario can account for the loss of directional control and stability when either two rotors of the same or opposite rotation fail.

However, even with the control of the various rotors in the event of rotor failure, it can be necessary, to consider the aerodynamics of a system that generates lift from a fixed wing and a multirotor vertical thrust system. Many embodiments described herein are complex systems that utilize novel control system architectures to produce efficient flight capabilities. In accordance with many embodiments a control system similar to that illustrated in FIG. 16 may be used to account for the complex aerodynamics of the air transport vehicle described herein.

Figure 16:
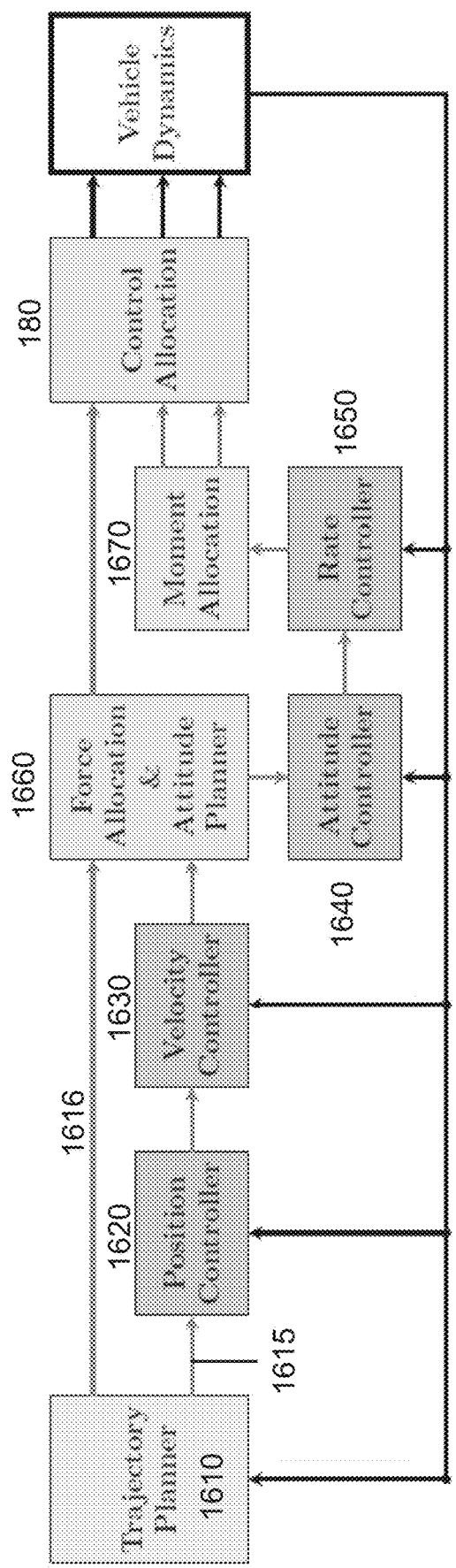
FIG. 16 illustrates a controller framework according to many embodiments of the invention.

FIG. 16 illustrates a control system that utilizes a split methodology for controlling the final vehicle dynamics. For example, the control system may begin with designing the position/velocity (1620 and 1630) and attitude/rate (1640 and 1650) using net forces and moments as input. Secondly, the system in accordance with many embodiments may use force 1660, moment 1670, and control 1680 allocations to generate the desire wrench. According to many embodiments, the trajectory planner 1610 may generate a desired attitude 1616 and position 1615 of the air transport vehicle and direct those inputs into the force allocation module and position controller respectively. Subsequently, the force allocation module 1660 may receive a desired force input from the velocity controller 1630. The force allocation controller can generate a desired force output 1665 as well as a desired reference attitude 1668. The moment allocation 1670 may then receive attitude input from the rate controller 1650 for generation of an input for the control allocation module 1680. Ultimately, the control system of FIG. 16 in accordance with many embodiments can provide for active control of the rotor thrust directions which can help improve the flight performance of a vehicle by adaptively changing the spaces of attainable force and moment based on the requirement provided by high level controllers. In many embodiments, the vehicle can avoid oversaturation of the rotors while ensuring the adequate force and moment from the controllers.

Figure 17:
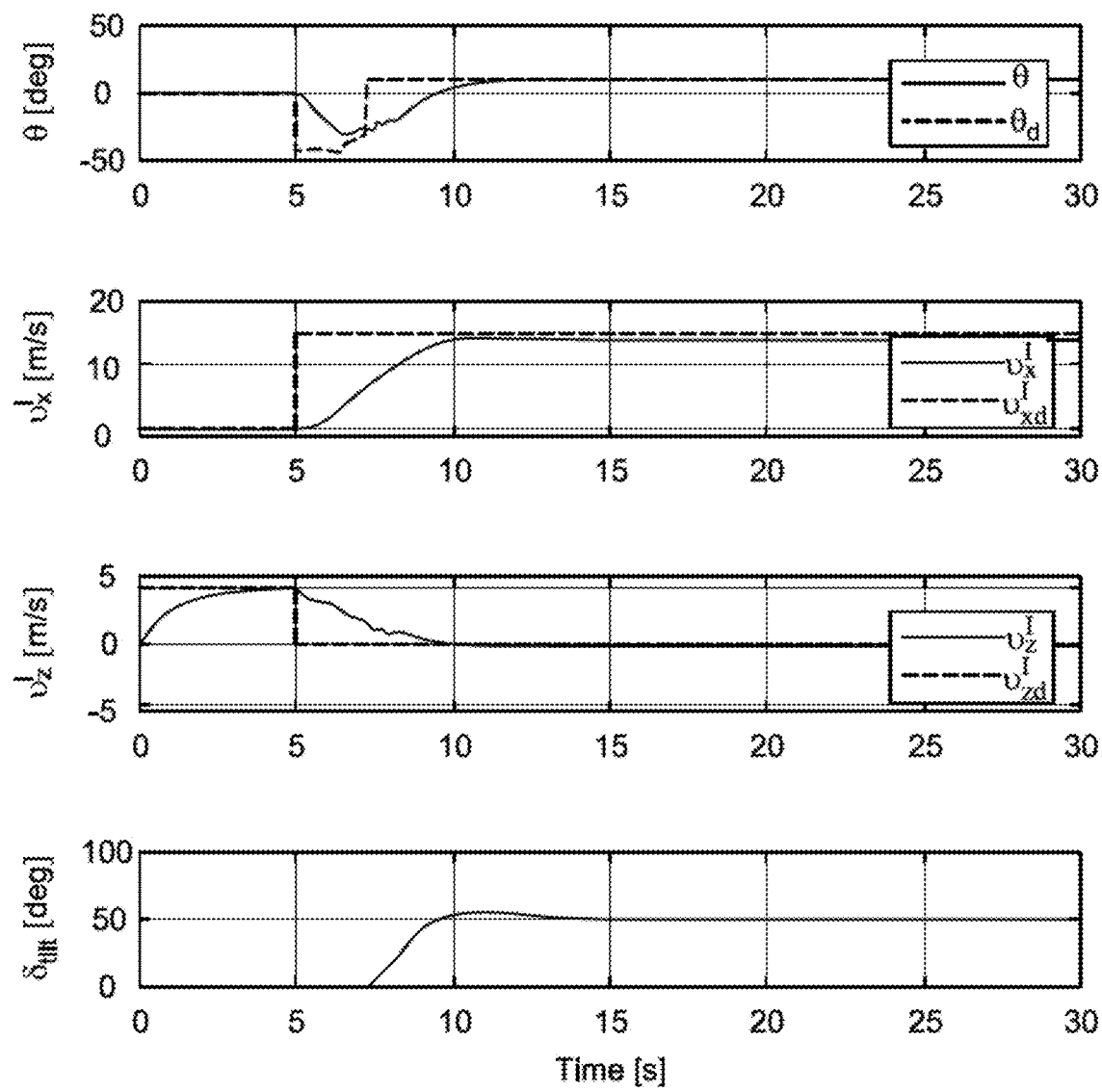
FIG. 17 is a graphical illustration of velocity tracking according to various embodiments.
Figure 18:
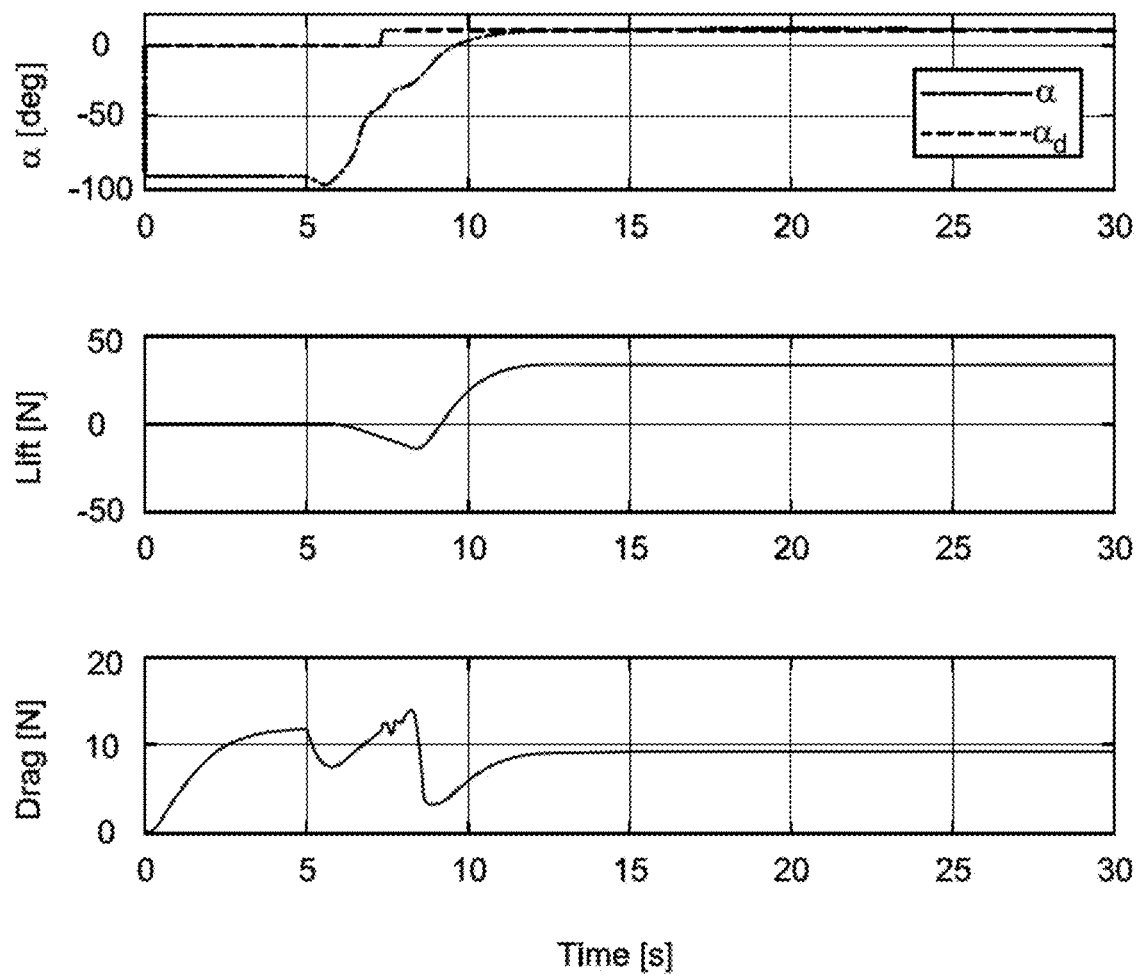
FIG. 18 is a graphical illustration of the angle of attack and the representative lift and drag produced therefrom according to various embodiments.

Turning now to FIGS. 17 and 18, the use of the control system of FIG. 15 can be illustrated through the graphical illustrations of FIGS. 17 and 18 that show various flight characteristics. For example, FIG. 17 illustrated the velocity tracking of an air transport vehicle in accordance with an embodiment of the invention, where the air transport vehicle first receives a command of pure ascending flight and transitions to a steady level forward flight. It can be seen from the bottom portion of FIG. 17, when the command for forward flight is given, the air transport vehicle tilts similar to that of a multirotor aircraft and then transitions to a flat trajectory when the fixed wing begins to generate lift. The transition, according to many embodiments can take place and allow for the side rotors to reduce power consumption and transition the power to the rear rotors to provide horizontal thrust in conjunction with the lift properties of the wing to maintain sustained flight. It can be seen that the lift of the wing quickly takes over in generating the lift necessary for flight.

FIG. 18 further illustrates the behavioral transitions during the complex transition of forward flight from the side rotors to lift generated from the fixed wings. For example, the top chart in FIG. 18 illustrates the change in angle of attack during the transition. Furthermore, the middle chart illustrates the increase in lift as the fixed wings begin to generate lift for the vehicle. It can be seen that many embodiments can implement the referenced controller system to overcome the complex issues surrounding the combined forces and moments of a multirotor aircraft and a fixed winged aircraft. Furthermore, the control system can account for changes in the flight and adjust the force allocation accordingly to maintain a desired wrench and allow safe and efficient flight; even in the event of a rotor failure.

Doctrine of Equivalents

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims

What is claimed is:

1. An automated flying transport comprising:
    an elongated body having an outer surface having a top portion, a bottom portion, a first and second side portion and a front and back portion, wherein the outer surface further defines an inner cavity;
    a slotted opening disposed through the first and second side portions and positioned within the body near an upper portion of the body;
    an airfoil disposed within the slotted opening and configured to generate lift during flight;
    a plurality of side rotors each having a rotor housing and wherein each is disposed along each of the first and second side portions near the bottom portion of the body such that the majority of the body is disposed above the plurality of rotors and wherein each of the plurality of side rotors are connected to an elongated side shaft having a proximal end and a distal end wherein the proximal end is connected to the body and the distal end is connected to the rotor housing and wherein each of the plurality of side rotors is connected to a power system wherein the power system is disposed within the inner cavity;
    a first rear rotor having a rotor housing disposed behind the back portion of the body at a predetermined distance and connected to an elongated support shaft having a first end and a second end wherein the first end is connected to the body and the second end is connected to the rotor housing, wherein the first rear rotor is connected to the power system, wherein the first rear rotor is configured to provide thrust to the transport;
    a controller system disposed within the inner cavity having a horizontal control element and a vertical control element and in electronic communication with the plurality of side rotors and the first rear rotor and configured to coordinate a rotational moment of each of the rotors thereby producing a corresponding thrust such that the transport further comprises a vertical motion and a horizontal motion,
    wherein the vertical motion is controlled by a vertical thrust generated by at least the plurality of side rotors; and
    wherein the horizontal motion is controlled by a thrust generated from the first rear rotor, wherein the airfoil further generates a lift force during the horizontal motion.

2. The transport of claim 1 wherein the air foil further comprises a first and a second airfoil opposingly disposed within the slotted opening and wherein each of the first and second airfoils are rotatably connected to the body thereof and further connected to a mechanical drive system configured to receive control inputs from the controller system and translate the control inputs into a coordinated rotational movement of each of first and second airfoils such that the air foils may be disposed in a deployed configuration and a stored configuration,
    wherein the air foils in the deployed configuration are positioned such that the cross section of the air foil is poised to generate lift during the horizontal motion; and
    wherein the air foils in the stored configuration are positioned such that no lift is generated by the cross section thereof.

3. The transport of claim 1 wherein each of the plurality of side rotors are rotatable about a fixed axis that runs perpendicular to a longitudinal axis of the body wherein the rotation thereof is capable of producing a thrust vectoring of the rotors.

4. The transport of claim 1 where in the first rear rotor is rotatable about an axis perpendicular to the support shaft such that the first rear rotor can produce a thrust vectoring according to a desired position of the first rear rotor, wherein the rotation thereof is controlled by a rotational motor in communication with the control system and wherein the position of the first rear rotor is controlled by the control system.

5. The transport of claim 4 wherein the rotational motor is disposed within the body and connected to the first rear rotor at a pivot point located at the second end of the elongated support shaft.

6. The transport of claim 4 wherein the rotational motor is disposed at the second end and enclosed within the rotor housing.

7. The transport of claim 1 wherein the inner cavity is configured to accommodate a human being.

8. The transport of claim 1 further comprising an access door wherein the access door is disposed on the front portion of the transport and connected to the body thereof by a means selected from a group consisting of hinges and sliding mechanisms.

9. The transport of claim 1 further comprising access panels wherein the access panels operate to allow access to the internal components of the transport.

10. The transport of claim 9 wherein the access panels are disposed in a position on the body selected from a group consisting of the bottom portion and each of the side portions.

11. The transport of claim 1 further comprising a ducted shroud disposed on each of the plurality of side rotors and the first rear rotor wherein the ducted shroud has a variable cross section such that the loss of thrust at the rotor tips is minimized and the velocity of air flow of the rotors is maximized.

12. The transport of claim 1 further comprising at least a second rear rotor disposed in parallel to the first rear rotor on the opposing side of the longitudinal axis of the body.

13. The transport of claim 12 wherein each of the first and second rear rotors are rotatable about an axis perpendicular to the support shaft such that the first and at least second rear rotor can produce a thrust vectoring according to a desired position of the rear rotors, wherein the rotation thereof is controlled by a rotational motor in communication with the control system and wherein the position of the rear rotors is controlled by the control system.

14. A method for controlling a multirotor fixed wing transport comprising:
   obtaining a multirotor fixed wing transport further comprising an elongated body having an outer surface having a top portion, a bottom portion, a first and second side portion and a front and back portion, wherein the outer surface further defines an inner cavity;
   a slotted opening disposed through the first and second side portions and positioned within the body near an upper portion of the body;
   an airfoil disposed within the slotted opening and configured to generate lift during flight;
   a plurality of side rotors each having a rotor housing and wherein each is disposed along each of the first and second side portions near the bottom portion of the body such that the majority of the body is disposed above the plurality of rotors and wherein each of the plurality of side rotors are connected to an elongated side shaft having a proximal end and a distal end wherein the proximal end is connected to the body and the distal end is connected to the rotor housing and wherein each of the plurality of side rotors is connected to a power system wherein the power system is disposed within the inner cavity;
   a first rear rotor having a rotor housing disposed behind the back portion of the body at a predetermined distance and connected to an elongated support shaft having a first end and a second end wherein the first end is connected to the body and the second end is connected to the rotor housing, and wherein the first rear rotor is connected to the power system, wherein the first rear rotor is configured to provide horizontal thrust to the transport;
   a controller system disposed within the inner cavity having a horizontal control element and a vertical control element and in electronic communication with the plurality of side rotors and the first rear rotor and configured to coordinate a rotational moment of each of the rotors thereby producing a corresponding thrust such that the transport further comprises a vertical motion and a horizontal motion,
   wherein the vertical motion is controlled by a vertical thrust generated by at least the plurality of side rotors; and
wherein the horizontal motion is controlled by a thrust generated from of the first rear rotor, wherein the airfoil further generates a lift force during the horizontal motion;
   generating a desired position input for the multirotor fixed wing transport;
   generating a desired attitude for the multirotor fixed wing transport;
   inputting the desired position into a position controller wherein the position controller translates the position input into a velocity component input to generate a corresponding force feedback input;
   combining the desired attitude and generated force feedback in a force allocation module and generating an attitude input for an attitude controller wherein the attitude controller generates a desired wrench input into a rate controller; the rate controller translates the desired wrench into a force moment input for a moment allocation module;
   combining the force moment input and force feedback from the force allocation module into a control allocation module;
   allocating appropriate force generation voltages to the plurality of side and rear rotors.

\* \* \* \* \*